Figure 1:
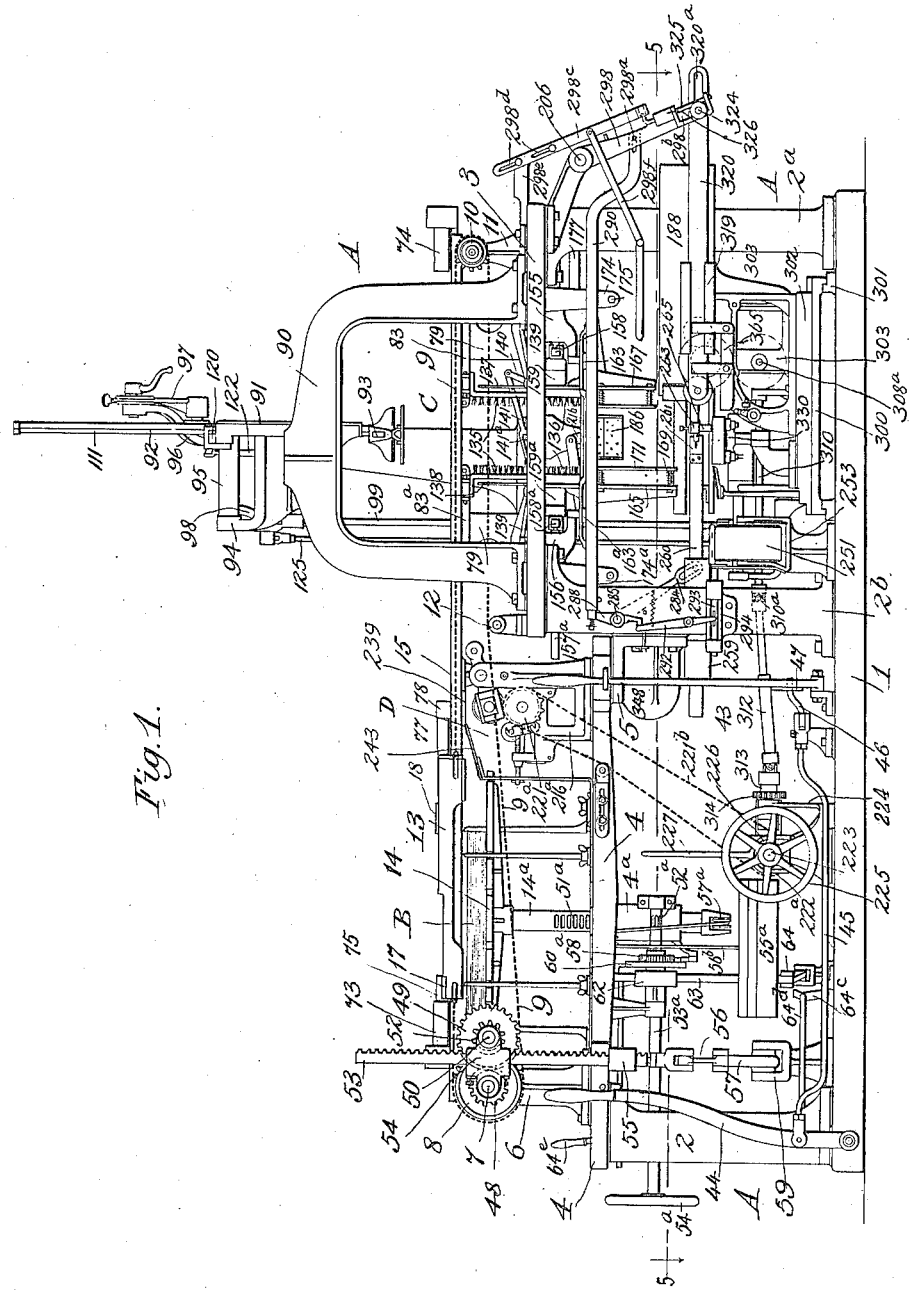

P. S. SMITH.
PACKAGE WRAPPING MACHINE.
APPLICATION FILED JULY 17, 1909.

1,068,460.

Patented July 29, 1913.
21 SHEETS—SHEET 5.

WITNESSES

INVENTOR
PHILIP S. SMITH
by Meyers, Cushman & Rea
Attorneys.

P. S. SMITH.
PACKAGE WRAPPING MACHINE.
APPLICATION FILED JULY 17, 1909.
1,068,460.
Patented July 29, 1913.
21 SHEETS—SHEET 6.
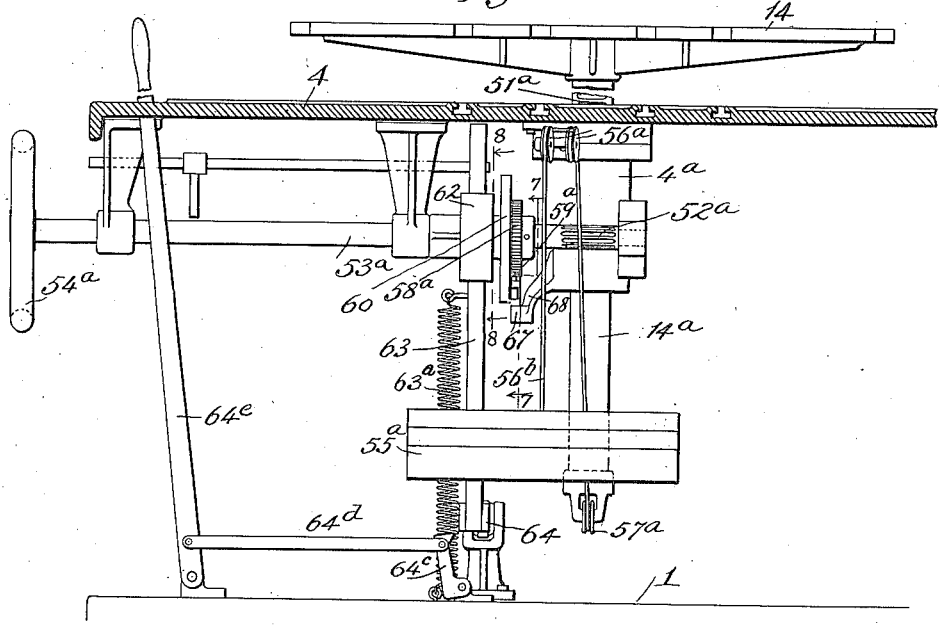
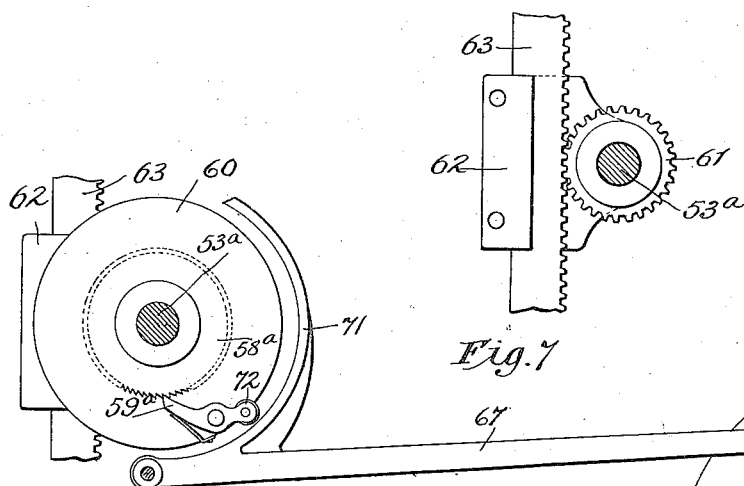
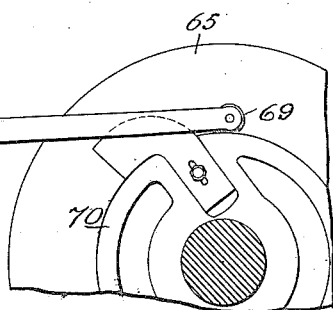
WITNESSES
INVENTOR
PHILIP S. SMITH
Attorneys.

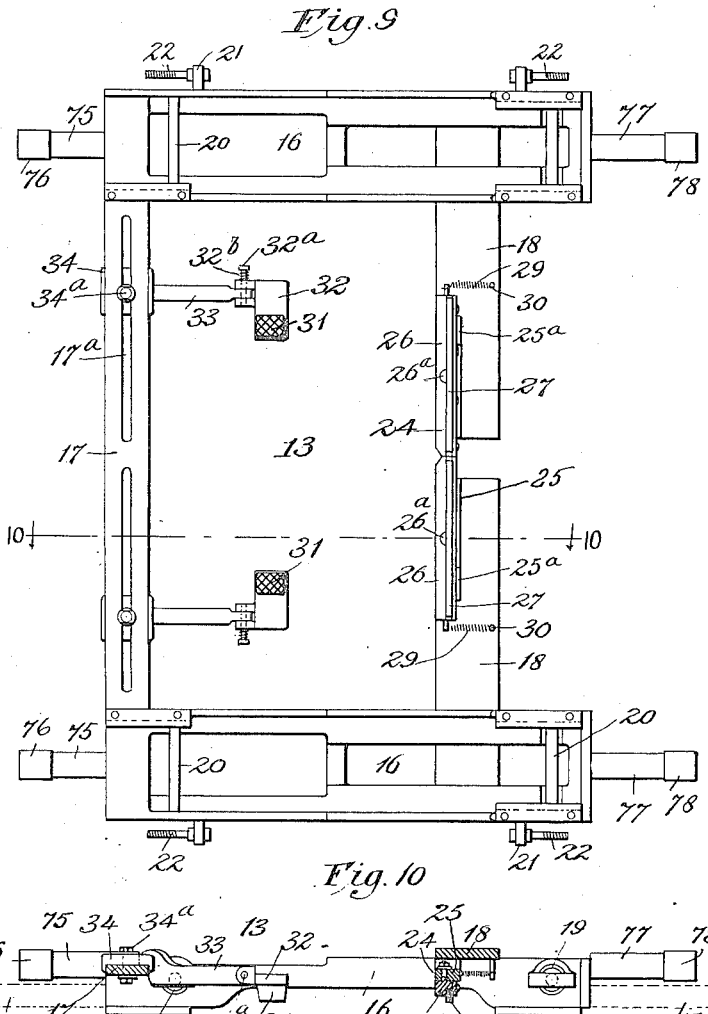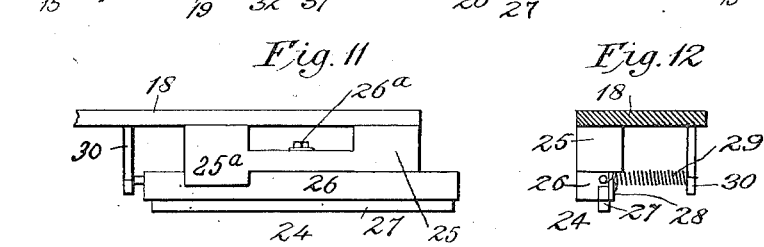

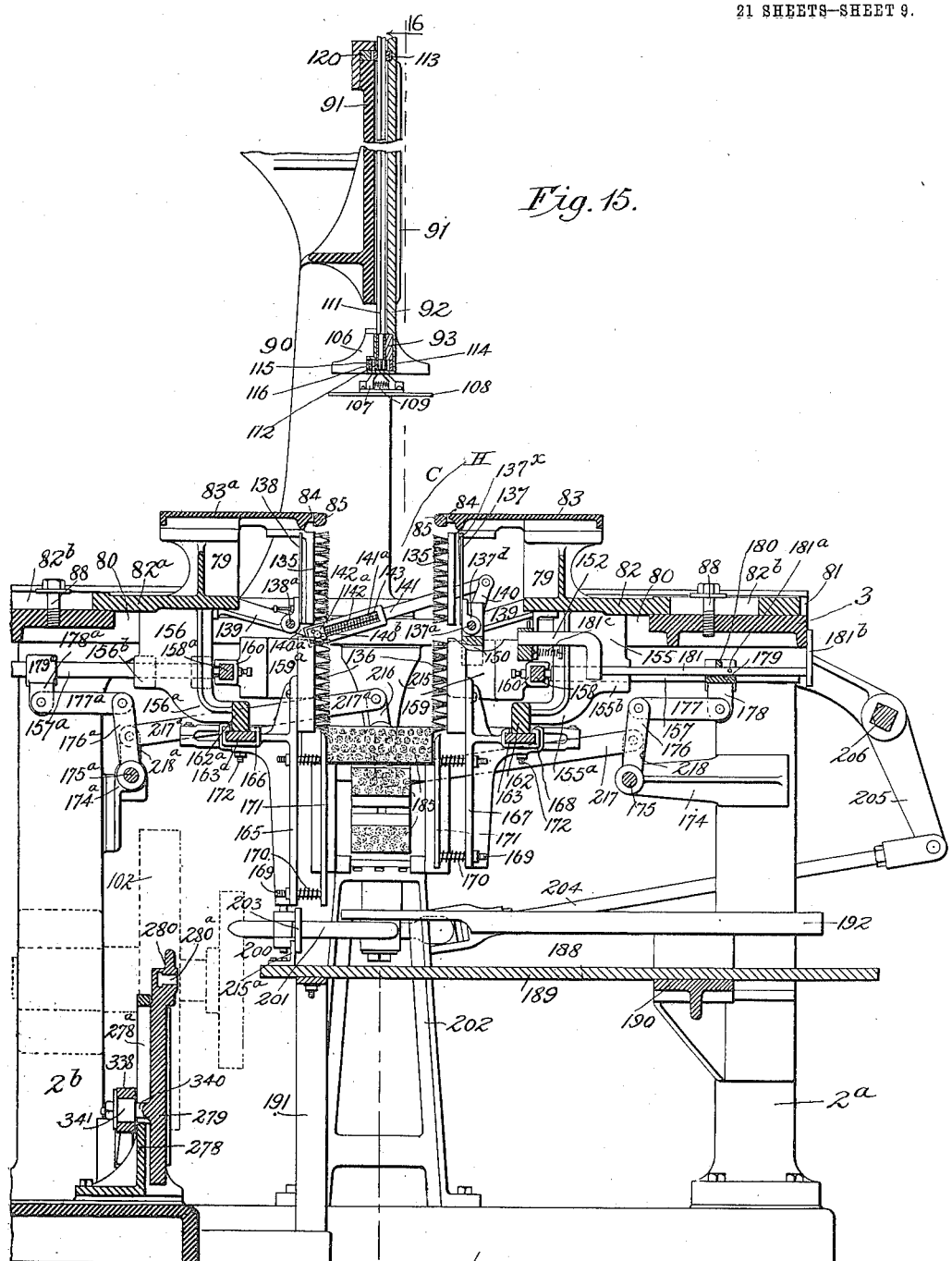

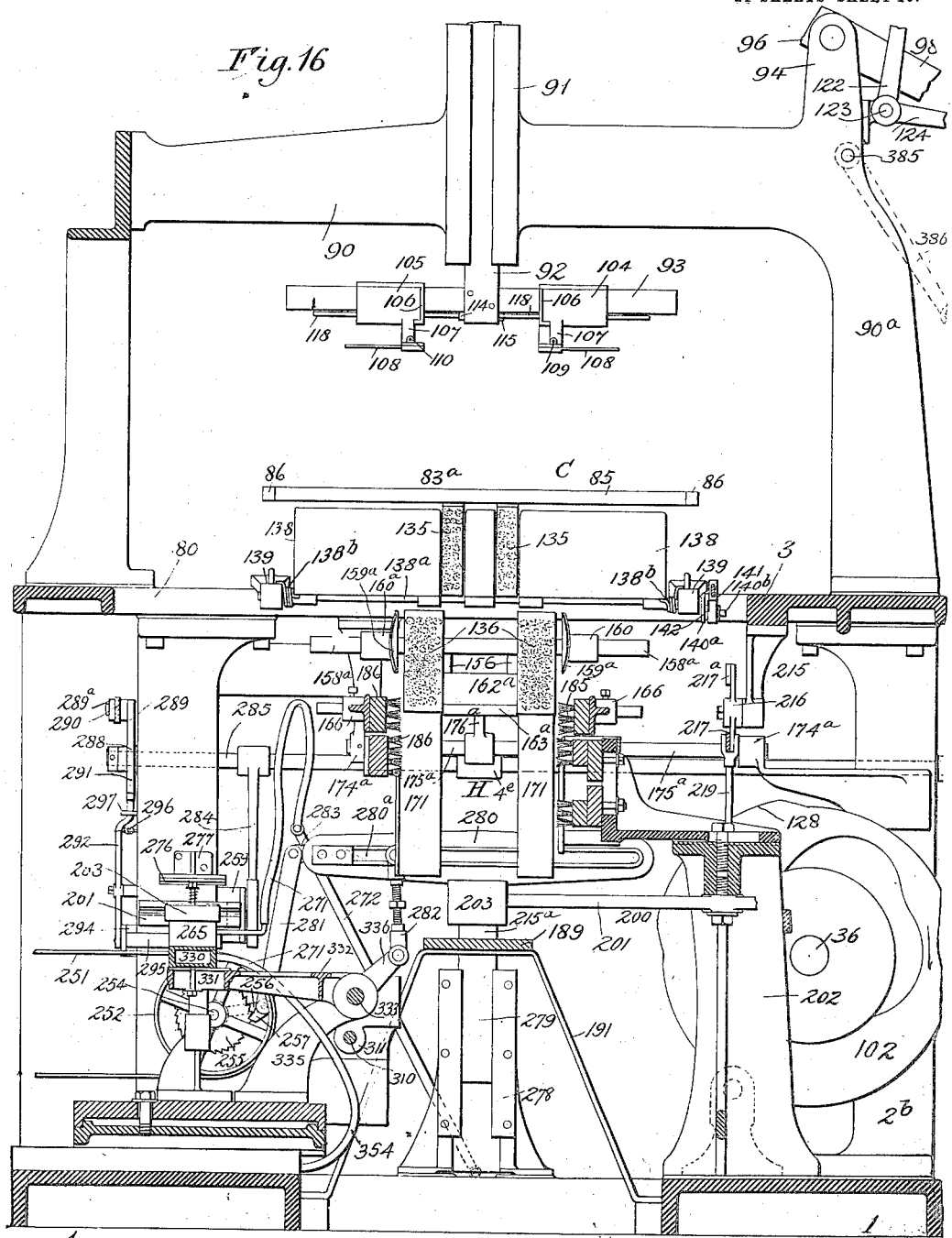

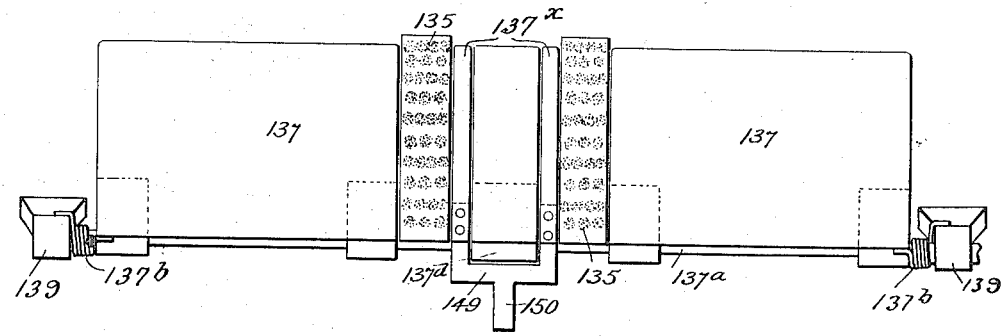
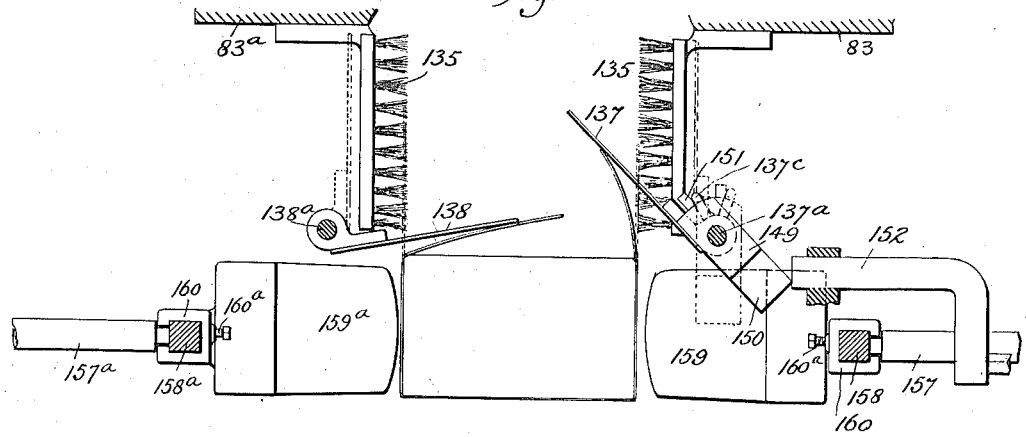
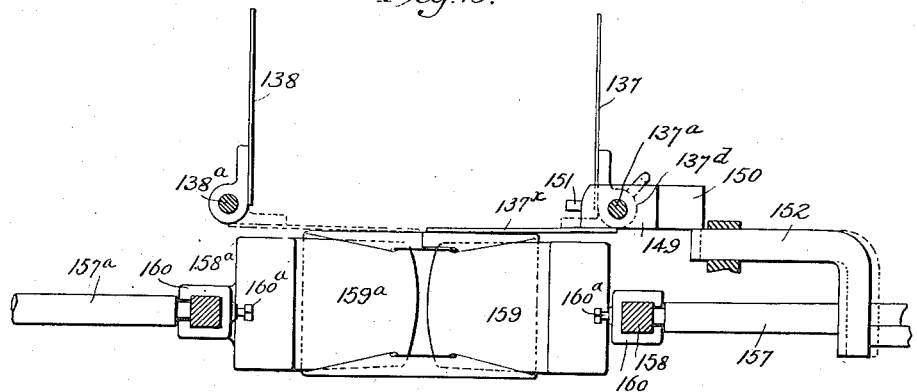

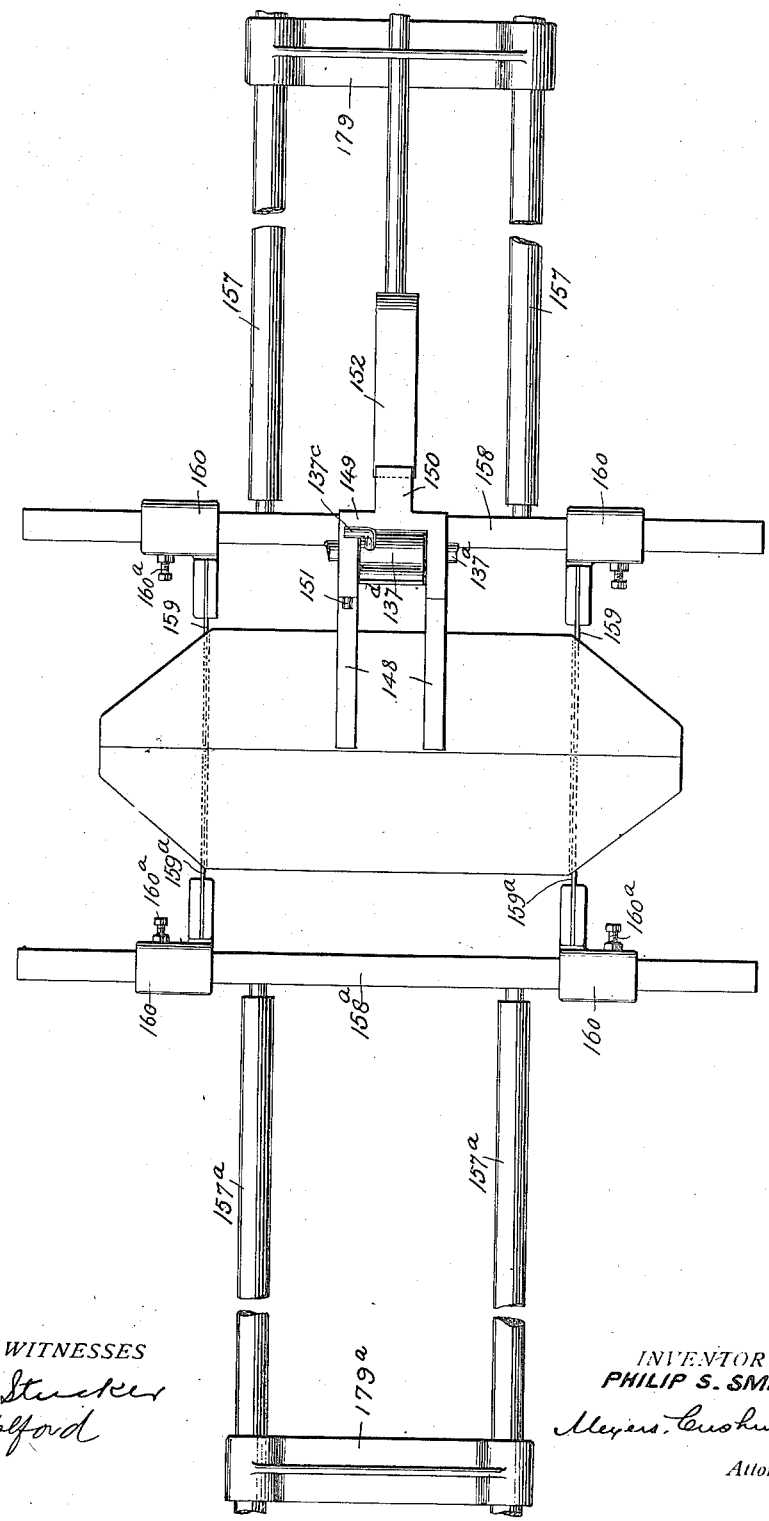

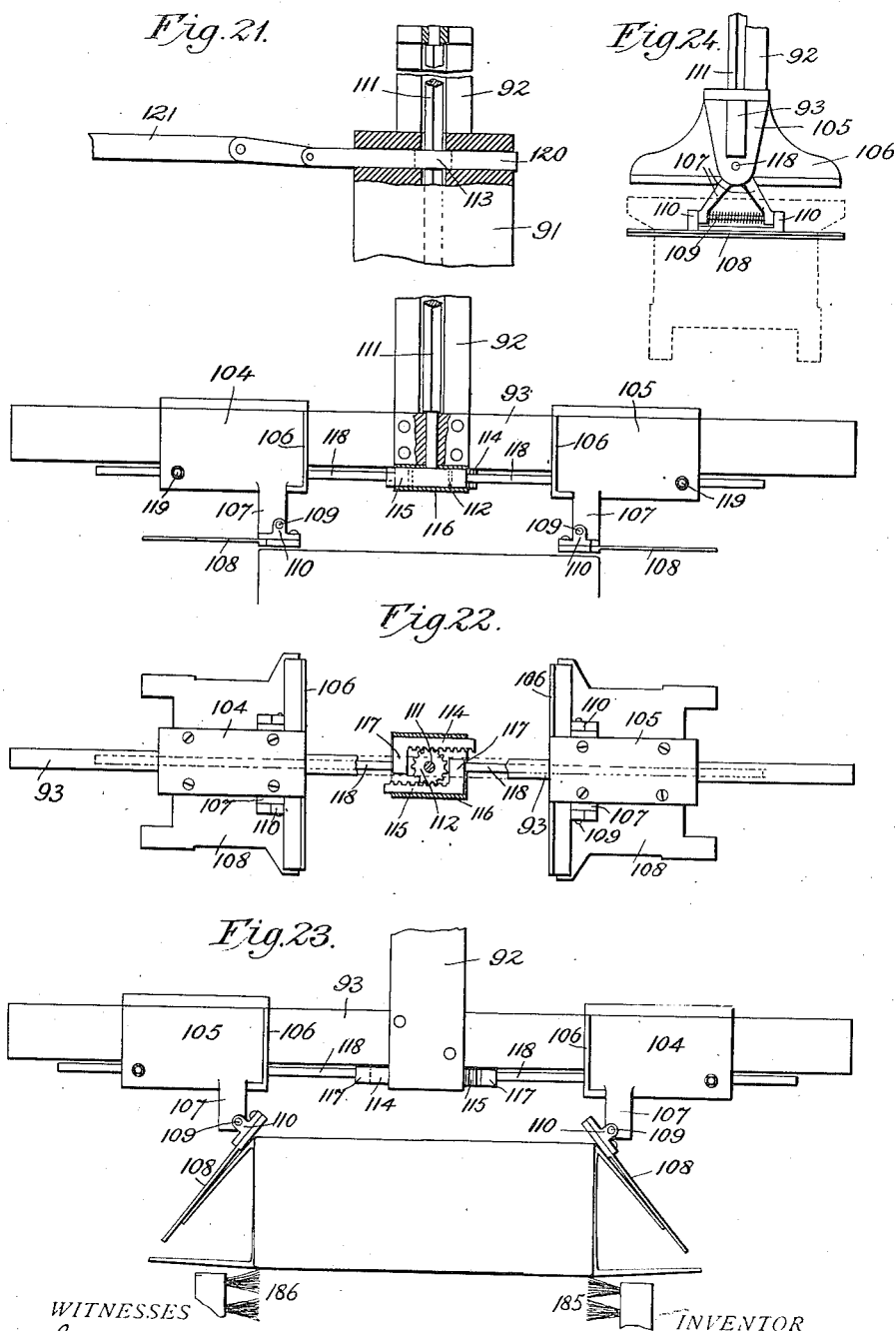

P. S. SMITH.
PACKAGE WRAPPING MACHINE.
APPLICATION FILED JULY 17, 1909.
1,068,460.
Patented July 29, 1913.
21 SHEETS—SHEET 14.
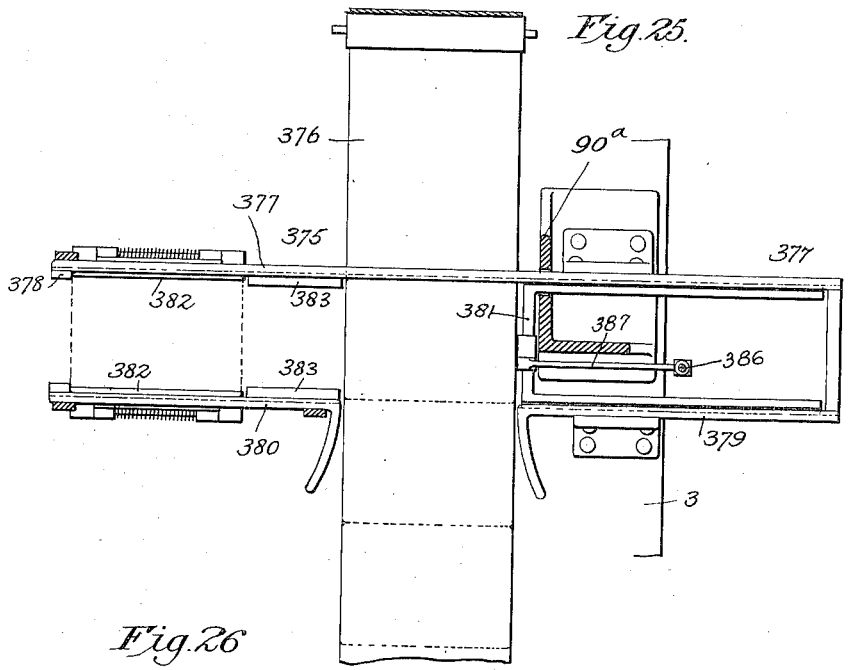
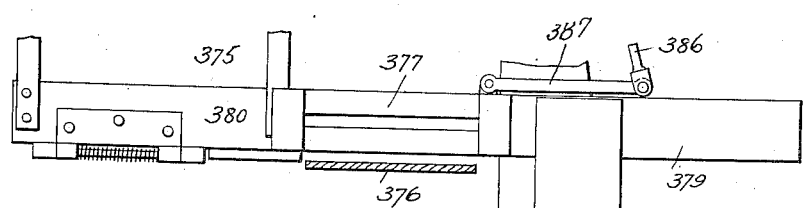
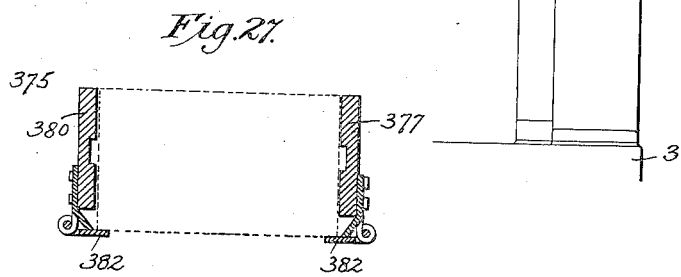
WITNESSES
INVENTOR
PHILIP S. SMITH
Attorneys.

P. S. SMITH.
PACKAGE WRAPPING MACHINE.
APPLICATION FILED JULY 17, 1909.

1,068,460.

Patented July 29, 1913.
21 SHEETS—SHEET 15.

WITNESSES

INVENTOR
PHILIP S. SMITH

Attorneys.

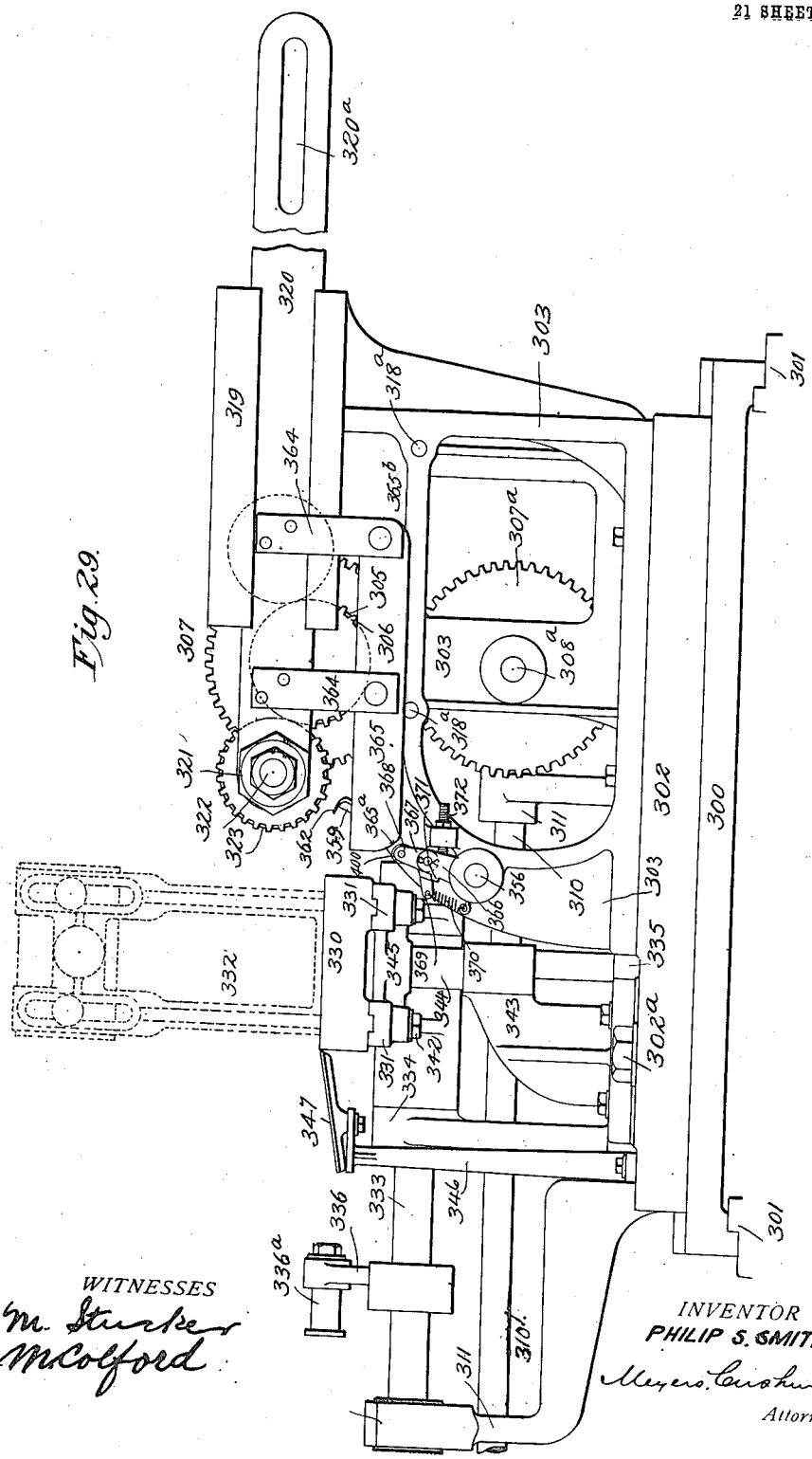

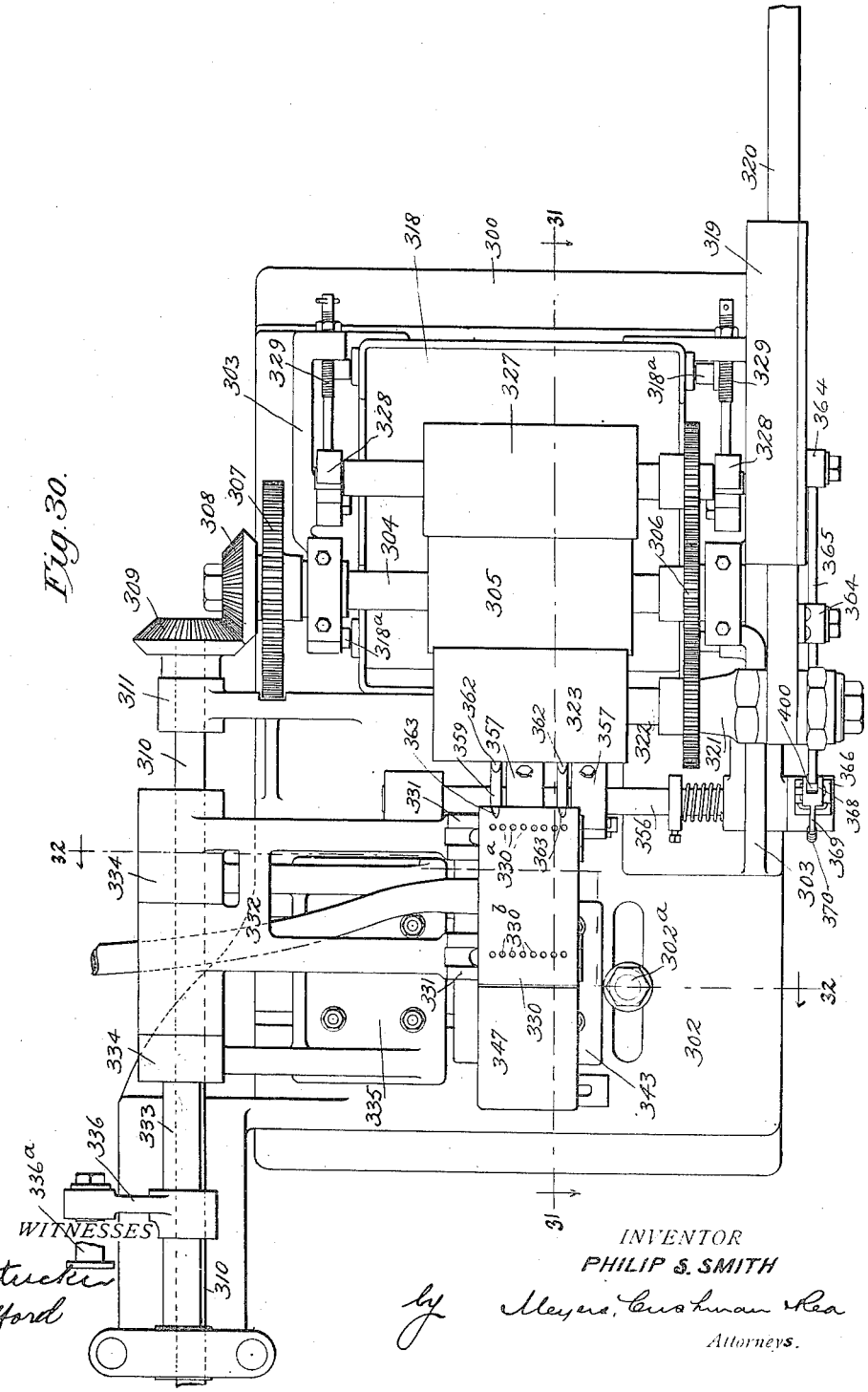

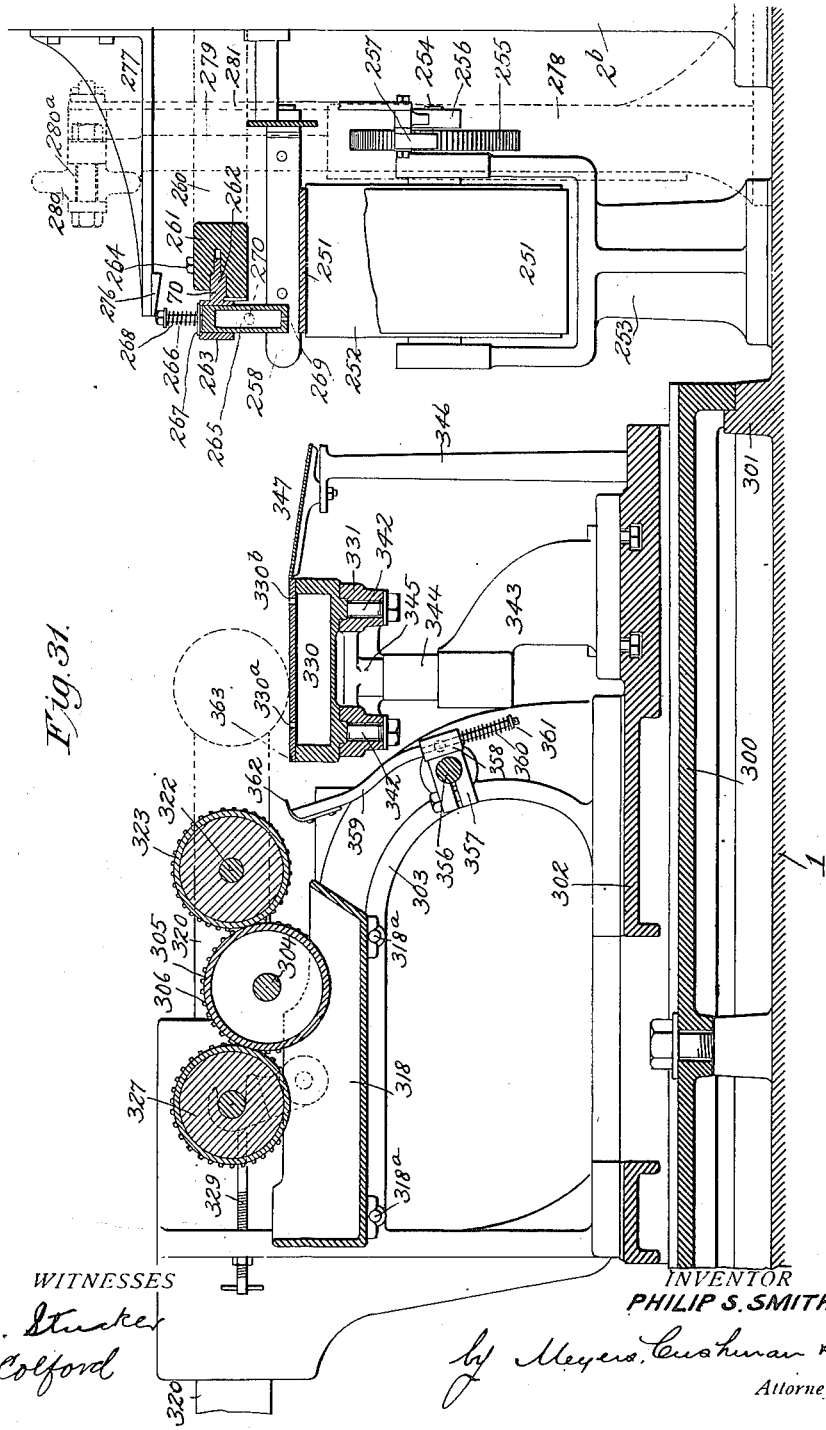

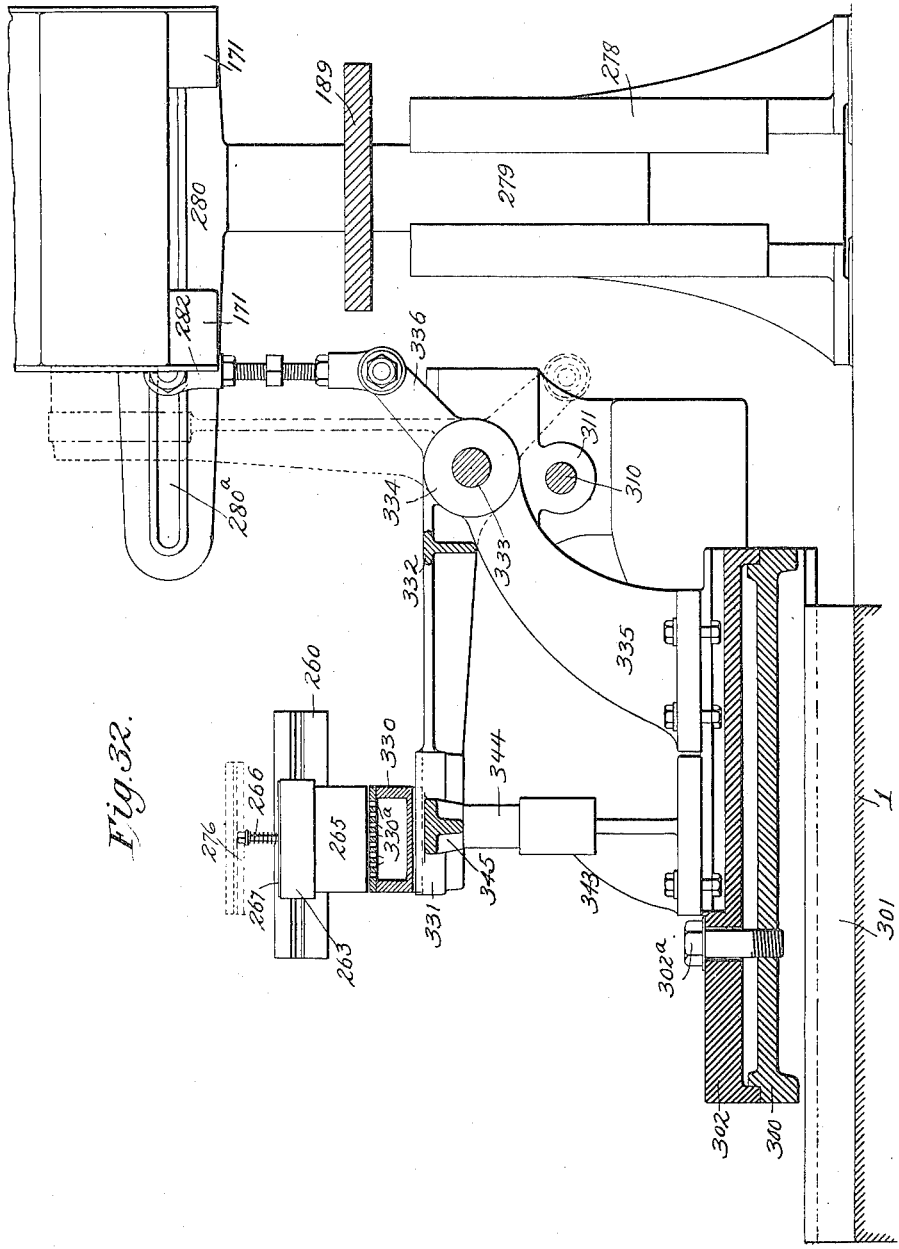

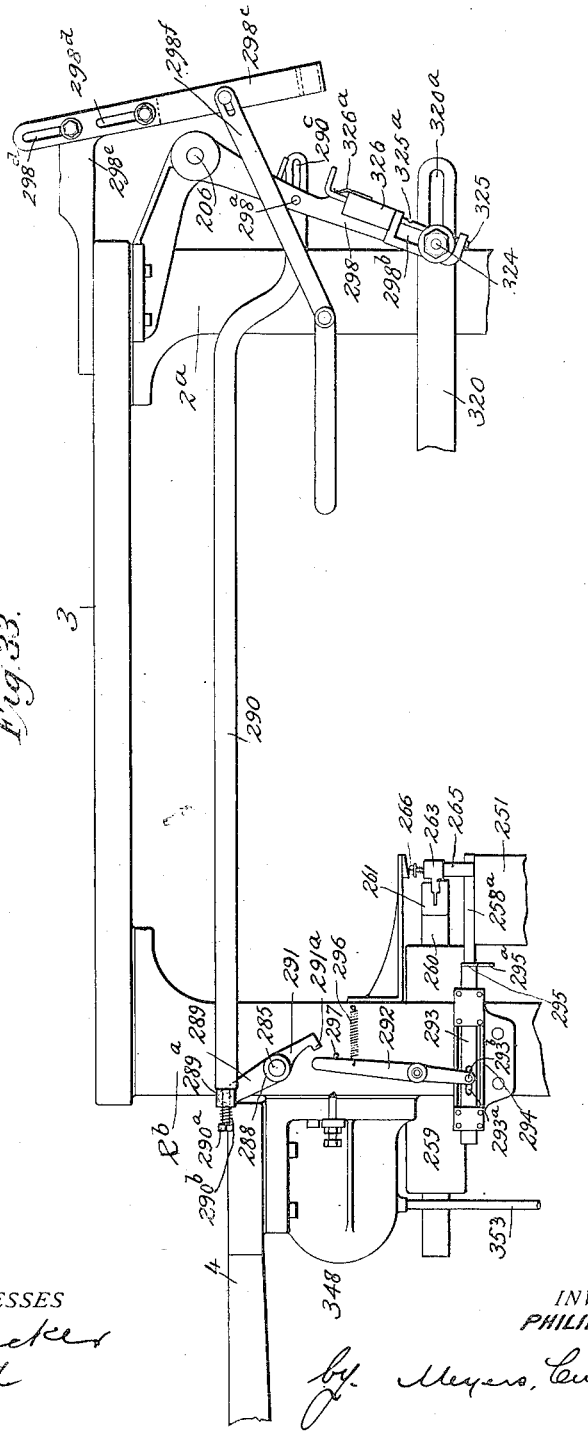

P. S. SMITH.
PACKAGE WRAPPING MACHINE.
APPLICATION FILED JULY 17, 1909.

1,068,460.

Patented July 29, 1913.
21 SHEETS—SHEET 21.

WITNESSES

INVENTOR
PHILIP S. SMITH

Attorneys

UNITED STATES PATENT OFFICE.

PHILIP S. SMITH, OF PHILADELPHIA, PENNSYLVANIA.

PACKAGE-WRAPPING MACHINE.

1,068,460.

Specification of Letters Patent.

Patented July 29, 1913.

Application filed July 17, 1909. Serial No. 508,231.

*To all whom it may concern:*

Be it known that I, PHILIP S. SMITH, a citizen of the United States, residing at Philadelphia, in the county of Philadelphia and State of Pennsylvania, have invented new and useful Improvements in Package-Wrapping Machines, of which the following is a specification.

This invention relates to package wrapping machines, and has for its object to provide an automatic mechanism designed more particularly for inclosing and sealing cartons smoothly and neatly in a wrapper of the proper size, and ejecting the same from the machine.

A further object of the invention pertains to novel means for applying a label on one side of the folded wrapper which may indicate the contents of the package.

To this end, the invention comprises a movable bed for carrying thereon in flat form, a stack of wrappers held in accurate position by suitable fixed marginal guide fingers which may be adjusted to receive between them wrappers of various sizes and in different positions on the bed so as to correctly register with the package to be wrapped. The wrappers are conveyed, one at a time, from the stack to the folding mechanism by means of a longitudinally reciprocating carriage provided with stencils or pads which receive glue or other adhesive material on the backward movement of the carriage ready to apply the same at the desired points on the uppermost wrapper during a pause at the end of the rearward movement of said carriage, at which time the wrapper supporting bed rises and brings the topmost wrapper against said stencils or pads. When the bed drops, the pasted wrapper adheres to the stencils and is carried forward with the carriage and centered over the wrapping mechanism. A package, in this instance a carton, is now placed in position on or over the wrapper and, as a plunger descends, it forces the carton and the wrapper beneath it between suitably disposed guides which bend up or fold the wrapper against two opposite sides of the carton. The descending carton and its wrapper is prevented from dropping through the throat of the folding mechanism by frictional means which bear against the wrapper where it is folded against the sides of the carton and keep said wrapper smooth and under tension. After descending a sufficient distance to carry the package into the throat to the next folding position, the plunger is withdrawn, to a height great enough to permit the carriage to return for another wrapper and enable a pair of folders to be brought into action for folding the ends of the wrapper over the top of the package and sealing them. A further movement of a separate part of the folding mechanism tucks a part of the projecting portions of the wrapper, which is now in tubular form, against the ends of the carton by the horizontal movement of a pair of sliding plates or tuckers at each end of the package that are moved from the front and rear sides of the carton toward the center thereof. The top or wing folders previously mentioned, which during a portion of this movement have been bearing on the folded ends of the wrapper, are now swung vertically so that the plunger may again descend and push the package lower.

End, wing folders, pivoted on the plunger are brought into operation on the second descent of the plunger and fold the overlapping portions of the wrapper which project from the upper side of the package at each end, before the plunger reaches the package and moves it farther down the throat of the folding mechanism. The sliding plates or tuckers begin to retreat as soon as the wing folders on the plunger start to operate. At or near the end of the movement of the wing folders, the plunger strikes the package and, as before stated, pushes it farther down the throat, releasing at the same time the folders thereon which immediately return to their normal horizontal position. In the further downward movement of the package, the ends thereof pass between stationary folding means which complete the folding operation by turning the remaining portions of the wrapper at the ends of the package upwardly against the downwardly turned portions, and as the upwardly folded portions contain the adhesive substance, they are secured firmly in place and pressed smooth by the fixed end folders as they pass. The package is finally pushed through the throat into a channel where it is held by friction until forced lower by a succeeding package. The plunger now rises to its normal position ready to act on the next carton and wrapper. During the first upward movement of the plunger which was sufficiently high to withdraw from the carriage, the latter began to move rearwardly, passing over the pasting device and the stencils thereon and received a new charge of adhesive material.

Below the lower end of the throat wherein a certain number of packages are retained by friction, is a trough with a flat bottom on which the lowermost package drops with the completion of each newly wrapped package, the dropped package to be moved forwardly along the trough by means of a kicker which is brought into operation at this time to push the packages resting in the trough along the same for a short distance and finally deliver them from the machine intermittently as they collect in the trough and are pushed forward by the kicker.

When a label is to be applied to one end of the wrapped package, a labeling device is attached to the bed plate of the machine in such relation to the lower end of the throat that the swinging arm or other means by which the label is placed on the package will, when moved to operative position, exactly coincide with the lowermost package in the throat and place the label thereon. The label may be applied on either end of the package by placing the labeling device on the proper side of the machine, or, by the use of two labeling devices, a label may be attached on both sides of the package.

Figure 2:
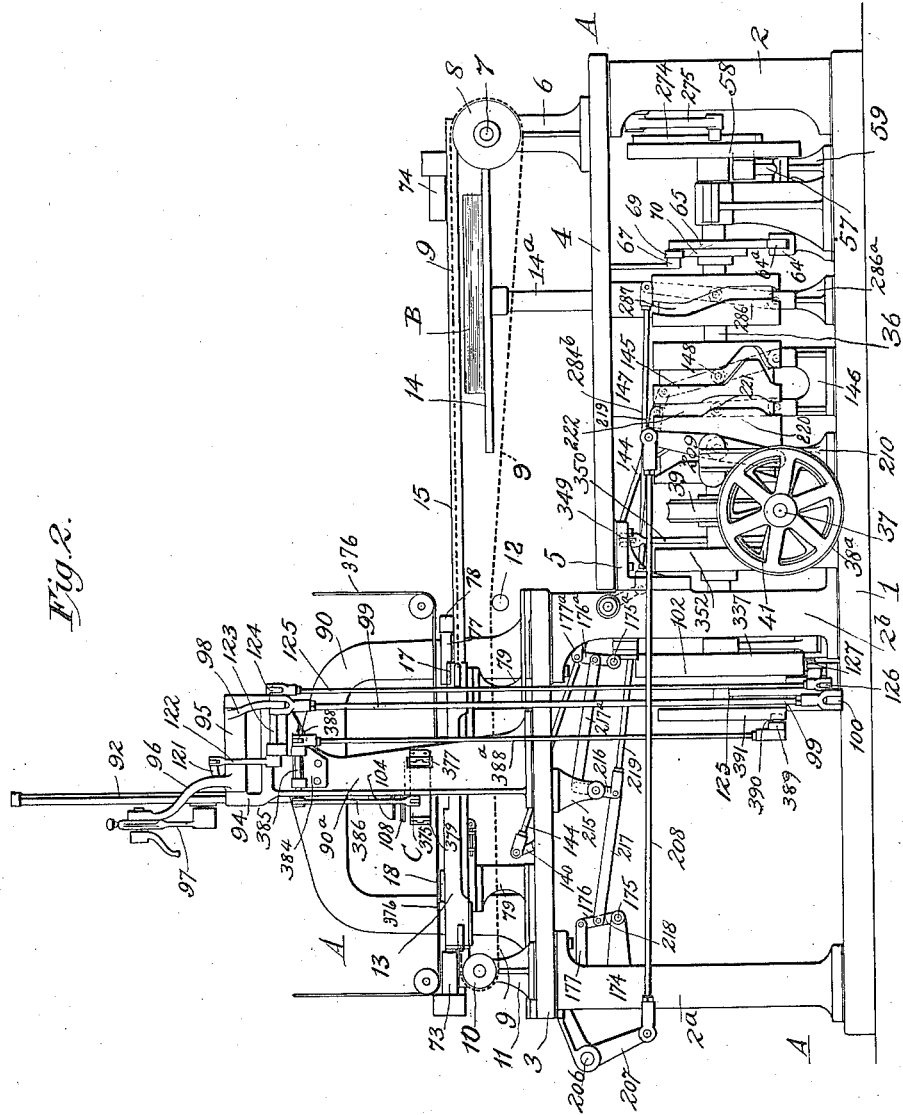
Figure 3:
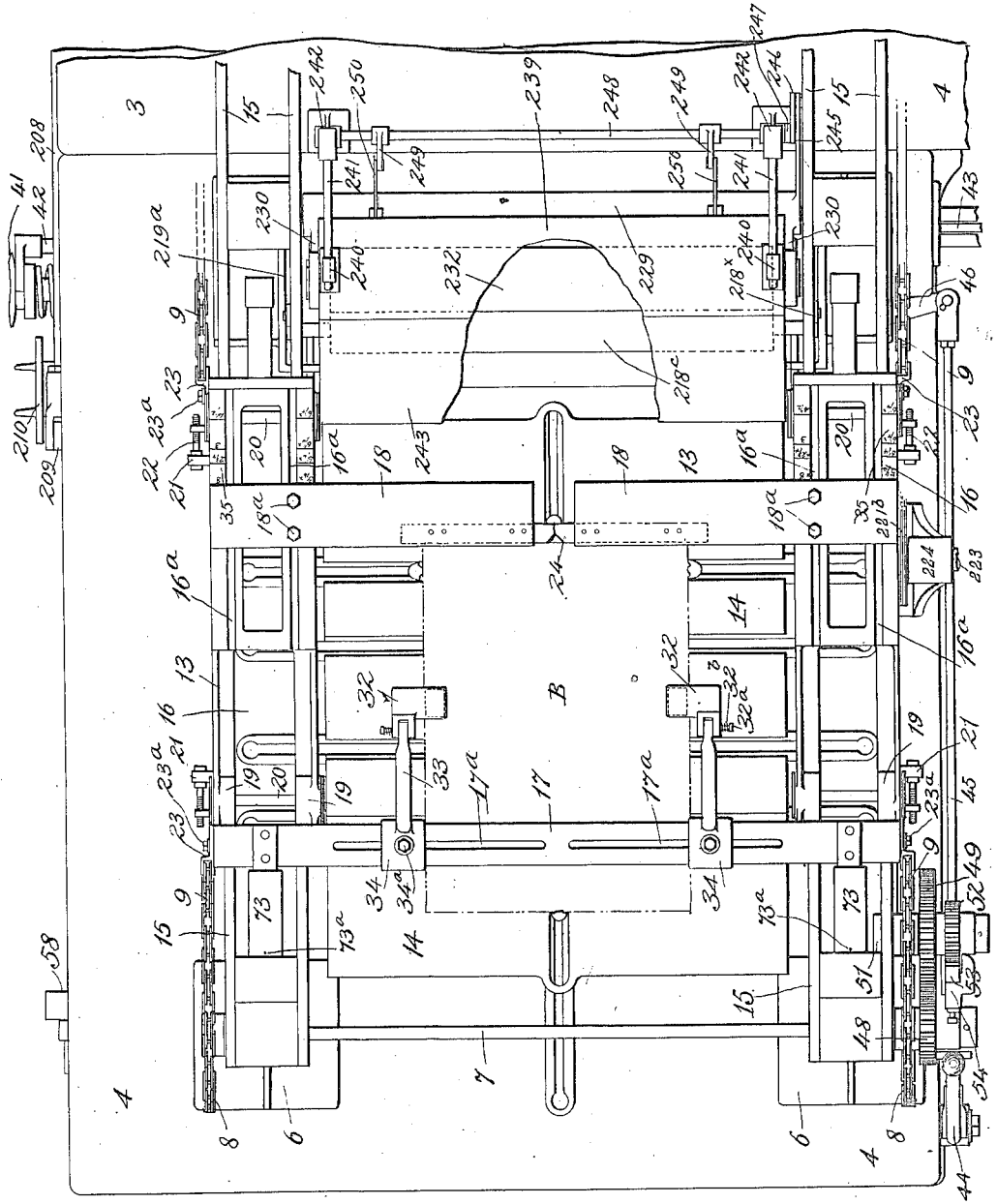
Figure 4:
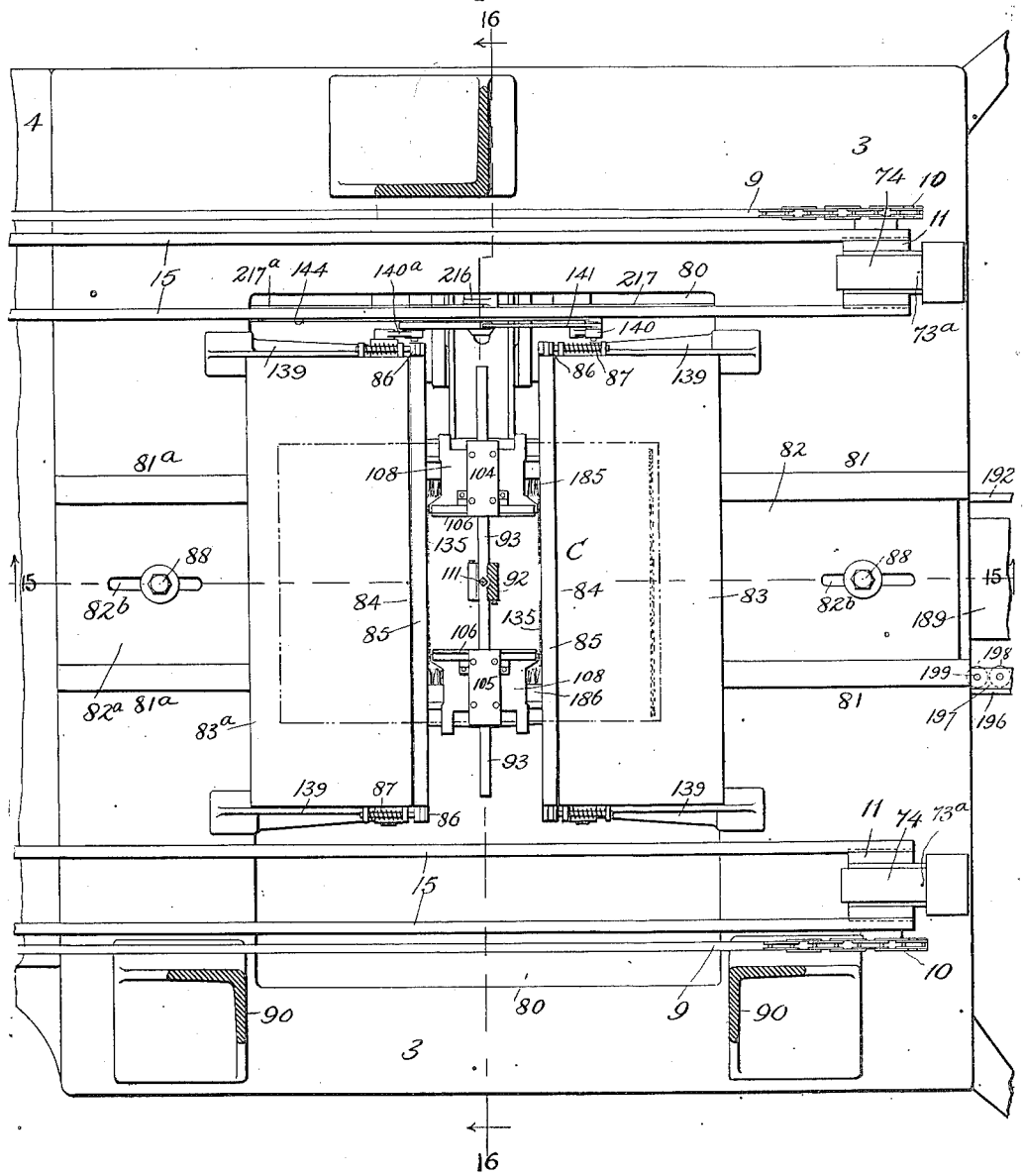
Figure 5:
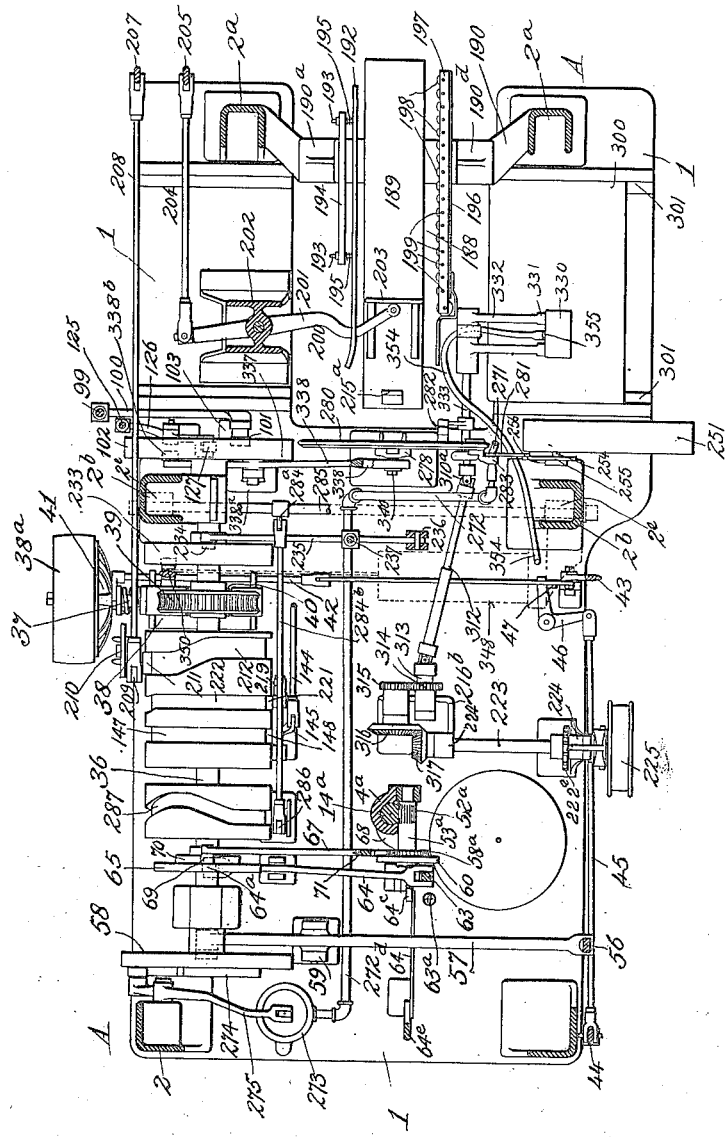
Figure 13:
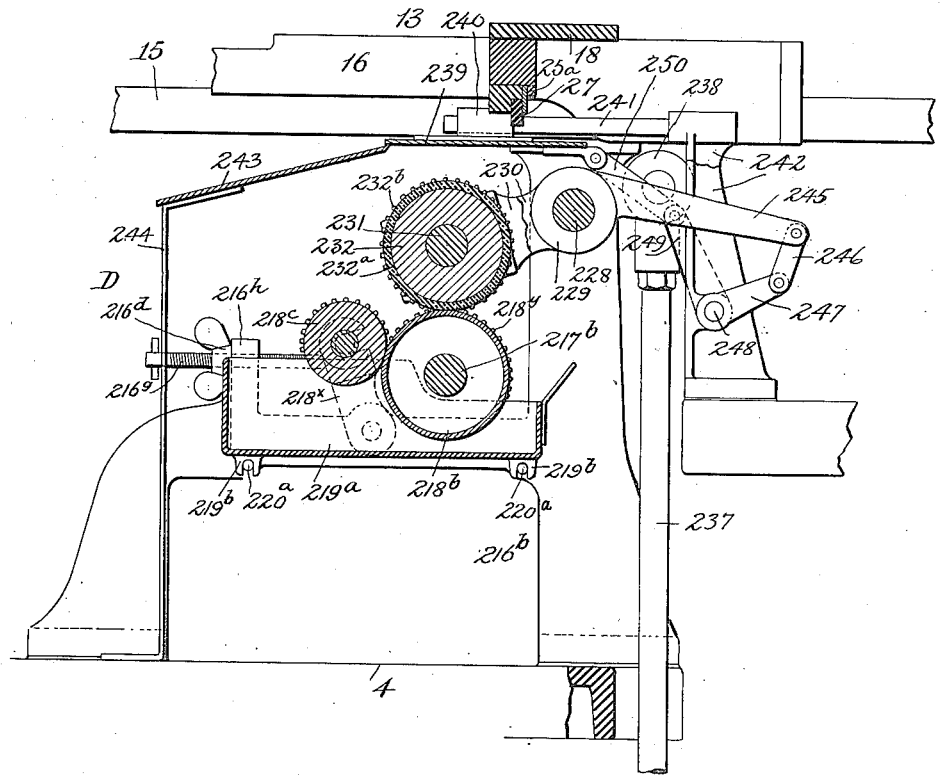
Figure 14:
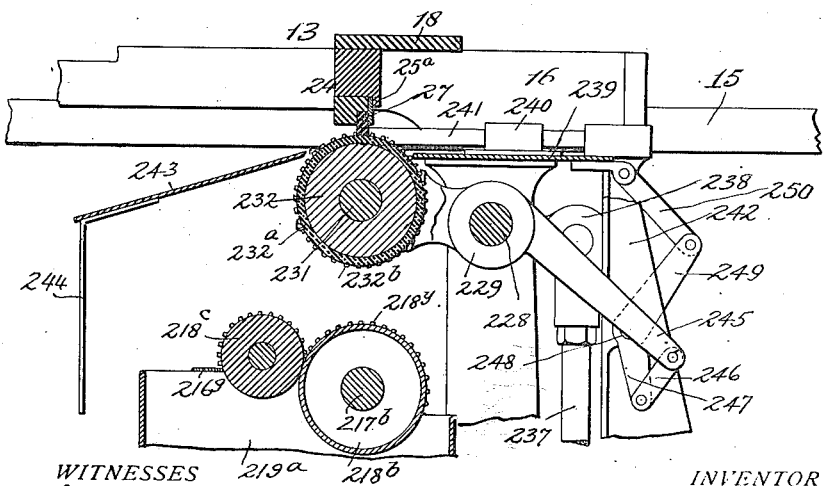
Figure 28:
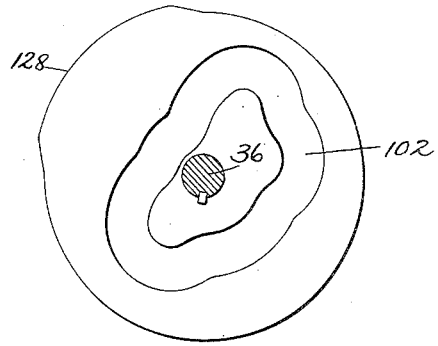
Figure 34:
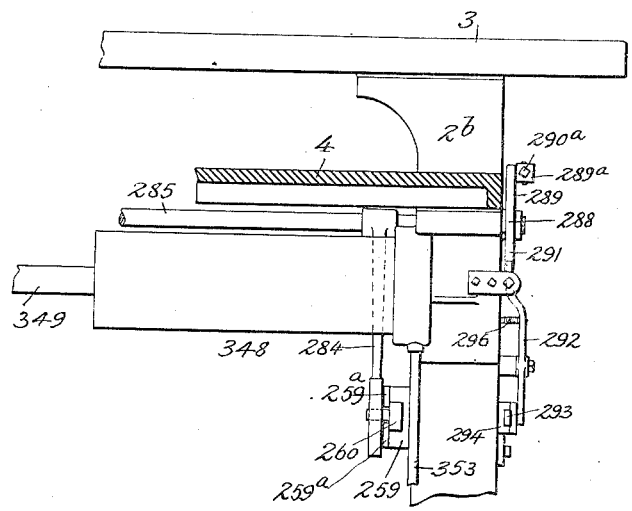

With these and other objects in view the invention consists of the novel construction, combination and arrangement of parts hereinafter described, pointed out in the claims and illustrated in the accompanying drawings in which, Figure 1 is an elevation of one side of the improved package wrapping machine; Fig. 2, a like view of the opposite side of the machine, certain features not deemed necessary being omitted: Fig. 3, a plan view, enlarged of the rear end of the machine showing among other things, the carriage, the wrapper bed and the wrapper pasting mechanism: Fig. 4, a like view of the opposite or folding end of the machine: Fig. 5, a horizontal sectional view of the entire machine on the line 5—5 of Fig. 1; Fig. 6 a vertical longitudinal sectional view enlarged through the rear of the machine to illustrate the means for raising and lowering the wrapper supporting bed; Fig. 7, a cross sectional view on the line 7—7 of Fig. 6; Fig. 8, a similar sectional view on the line 8—8; Fig. 9, a bottom plan view of the wrapper transporting carriage; Fig. 10, a section view of the carriage on the line 10—10 of Fig. 9; Figs. 11 and 12, detail views of one of the stencils; Fig. 13, a longitudinal sectional view enlarged of the pasting mechanism for the wrappers in inoperative position; Fig. 14, a similar view of a part of the pasting machine in operative position; Fig. 15, a central longitudinal sectional view through the wrapping mechanism on the line 15—15 of Fig. 4; Fig. 16 a transverse sectional view through the wrapping mechanism on the line 16—16 of Figs. 4 and 15; Fig. 17, an elevation of the front wing folders for turning down the glued end of the wrapper; Fig. 18, an end view of part of the wrapping mechanism showing both wing folders partly turned down over the package and the normal position of the tucker plates on one side; Fig. 19, a like view of the same parts in a different position; Fig. 20, a plan view of the tucker plates for folding in the side projecting parts of the wrapper over the ends of the packages, the tucker plates being shown in their inward position; Fig. 21, a rear elevation, partly in section, of a plunger showing the wing folders carried thereby; Fig. 22, a top plan view of the plunger partly in section; Fig. 23, a rear elevation of the plunger showing the folders carried thereby acting on the wrapper of a carton; Fig. 24, an end elevation of the plunger; Fig. 25 a plan view of the package feeding device; Fig. 26, a view of the same as seen from the front; Fig. 27 is a detail view of the package feeding device; Fig. 28, a detail view of the plunger operating cam; Fig. 29, a side elevation of the label applying mechanism; Fig. 30, a top plan view of the same; Fig. 31, a longitudinal section of the same on the line 31—31 of Fig. 30; Fig. 32, a cross sectional view of the same on the line 32—32 of Fig. 30; Fig. 33, an enlarged side elevation of the label registering device; Fig. 34 is an elevation of the same view from the left of Fig. 33, the table 4 being shown in cross-section; Figs. 35 to 41 inclusive are diagrammatic views illustrating the various stages in folding a wrapper about a package and the manner in which it is sealed.

Similar reference characters are used for the same parts on all the figures.

In the drawings, the various operative mechanisms are shown in Figs. 1, 2 and 5 as mounted upon and within a strong frame A comprising a bed plate 1 extending the length and width of the machine and substantially rectangular in outline.

For convenience of description, that end of the machine which carries the folding mechanism is called the front, the opposite end is called the rear, the side on the right is called the right side, and the side on the left, the left side.

Bolted on the bed plate at each rear corner, is an upstanding post or leg 2, at the opposite or front corner are posts or legs 2$^a$ and between each post 2 and 2$^a$ is a post or leg 2$^b$, the posts or legs 2$^a$ and 2$^b$ are higher than the posts 2 and sustain a horizontal supporting plate 3 bolted to said posts or 1 and the supporting plate 4 is a longitudinal shaft 36, see Figs. 2 and 5, on which are carried all the cams for operating the various mechanisms except the glue devices or fonts. The shaft 36 is rotated by a transverse shaft 37 turning in bearings on a frame 38 bolted on the bed plate 1 at a right angle to the cam shaft, which latter carries a worm wheel 39 driven by a worm 40 on the inner end of the transverse shaft 37 and a band wheel 38$^a$ loosely mounted on its outer end to which power is applied. Between the shaft 37 and the band wheel 38 is placed a clutch 41 of any suitable type to lock the two together when it is desired to rotate the shaft. A shifting rod 42 is connected to one element of the clutch 41 and extends across the machine where it is pivoted to an upright hand lever 43, near the middle leg 2$^b$, for operating the clutch. A second hand lever 44 is fulcrumed on the same side of the frame at the rear and, through a connecting rod 45 pivoted to said lever and to a bell crank lever 46, one arm of which engages a lug 47 on the shifting rod 42, the clutch may be operated from the rear of the machine.

Fast on one end of the sprocket shaft 7, Figs. 1 and 3, is a gear wheel 48 meshing with a larger gear wheel 49 mounted to rotate on a stud shaft 50 supported by a bracket 51 projecting from the adjacent bearing 6. Secured on the outer side of the larger gear wheel 49 is a small gear wheel 52 with which is engaged a vertically disposed rack bar 53 slidably mounted in a housing 54 supported on the shafts 7 and 50 and a second housing 55 bolted on the supporting plate 4. A link 56, Fig. 5, connects the lower end of the rack bar 53 with one end of a transverse lever 57 provided with a roller on its opposite end running in a cam groove 58 cut in the side of a disk keyed on the main shaft 36. The lever 57 is fulcrumed intermediate its ends in a bracket 59 bolted on the bed plate 1. The shape of the cam 58 and its position on the shaft 36 is such that a single rotation of said cam will cause the lever 57 to vibrate in a vertical direction and raise and lower the rack bar 53 turning gear wheel 52 in one direction or the other. As the gear wheel 52 is fixed to the gear wheel 49 the latter will rotate the gear wheel 48 on the shaft 7 and, of course, impart motion to the sprocket wheels 8 thereby rotating the chains 9 passing around them. As these chains are fastened to the carriage, as hereinbefore described, the latter will be moved from one end of the frame to the other, and back again by a single rotation of the cam 58. The cam groove is made with a pause or dwell at each end of its throw for the purpose of holding the carriage stationary above the wrapper table and above the folding mechanism.

Near the rear end of the supporting plate 4 is mounted the vertically movable bed or table 14, Figs. 1, 2, 6, 7 and 8, fixed on the upper end of a central post 14$^a$ slidable in a bearing 4$^a$ affixed to or integral with the under side of the bed or plate 4. On one side of the post 14$^a$ are teeth 51$^a$ forming a rack with which a pinion 52$^a$ on the inner end of a short longitudinal shaft 53$^a$, engages. This shaft 53$^a$ is placed below the supporting plate 4 and is carried in suitable bearings fastened to the underside thereof. The shaft 53$^a$ projects beyond the rear of the machine and is there provided with a hand wheel 54$^a$ by means of which the shaft may be turned and the wrapper table raised and lowered.

The wrapper holding table 14 is automatically raised to bring the topmost wrapper against the gummed stencils on the carriage 13 by means of a weight 55$^a$ fastened on one end of a rope or chain 56$^b$ running over one or more pulleys 56$^a$ on the underside of the supporting plate 4 and thence downwardly to the lower end of the post 14$^a$, thence around a pulley 57$^a$ on the lower end of the post and up to the supporting plate 4 where it is fastened. The table is lowered by a suitable mechanism which comprises a ratchet wheel 58$^a$ keyed or pinned on the shaft 53$^a$ and operated by a pawl 59$^a$ pivoted on a disk 60, the latter mounted loosely on said shaft and connected to a gear wheel 61 also loose on said shaft 53$^a$. Mounted to rock on the shaft 53$^a$ is a housing 62 for guiding a rack bar 63 and retaining it in mesh with said gear 61. The rack bar 63 is arranged to be moved vertically through said housing by means of a transverse lever 64 pivoted at one end thereto and adapted to rock in a bearing bolted on the base plate 1. The opposite end of the lever 64 is provided with a roller 64$^a$ to engage the periphery of a cam disk 65 keyed to the main shaft 36. If at any time it be desired to prevent the wrapper table 14 from rising this may be done by means of a pawl 64$^c$ pivoted on the bed plate 1 and connected by a rod 64$^d$ with a lever 64$^e$ that extends from the base plate upwardly through an opening in the supporting plate 4. By moving the lever 64$^e$ forward, the pawl 64$^c$ will be carried under the end of the transverse lever 64 with which the rack bar 63 is pivoted and which it will be understood is in an elevated position.

With the exception of the time the carriage is at rest above the wrapper bed or table the latter is brought to its lowermost position and held there by means of the cam 65, the higher portion of which acting to depress the outer end of the lever 64 raises legs. A rear horizontal supporting plate 4 is bolted on the tops of the legs 2 and to brackets 5 attached to the legs 2ᵇ.

In upright bearings 6, see Figs. 1, 2, 3 and 4, mounted near the rear end of the rear supporting plate 4 is a transverse rotatable shaft 7 on each end of which is fastened a sprocket wheel 8 for driving two chains 9 passing around said sprocket wheels and around like wheels 10 carried on bearings 11 near the front end of the supporting plate 3. The lower stretch of each chain 9 may pass over an idler 12 to keep it from sagging. The sprocket chains 9 lie parallel to each other and extend substantially from the front to the rear end of the frame A and are attached to a carriage 13 which they drive to and fro over the machine for the purpose of carrying individual wrappers B, supported on a vertically movable bed or table 14 above the rear supporting plate 4 to the wrapping mechanism, designated generally by C, and mounted on the forward supporting plate 3. Screwed or bolted on the bearings 6 and 11 and to other supports on each side of the machine are horizontal rails 15 on which the carriage 13 runs. There may be one or two rails on each side of the machine, as desired, two being shown in the present instance.

The carriage 13 clearly shown in Figs. 3, 9, 10, 11 and 12, is rectangular in shape, comprising duplicate side bars 16 preferably cast from aluminum for the sake of lightness and connected at their rear ends by a bar or plate 17. Near the front end of each side bar 16 is bolted a plate 18 which plates project toward each other in the same straight line but are slightly separated at the center of the carriage. Journaled in anti-friction bearings 19 at each end of each side bar 16 is a roller 20 which rests on the rails 15 and enable the carriage to travel thereon from one end of the machine to the other with very little applied power. Lugs 21 project from the outer edges of the side bars 16 near their front and rear ends in which are journaled screws 22, threaded into L shaped couplings 23 pivotally attached on the ends of the chains 9. The chains can be tightened and retained under proper tension by means of these screws as will be readily understood. Bolts 23ª pass through slots in said couplings and into the side bars 16 to lock the couplings after adjustment.

Fastened on the underside of each forward plate 18 is a strip, pad or stencil 24 for receiving glue or other adhesive and transferring the same to a wrapper. Each stencil comprises a fixed member 25 fastened to the plate 18 and a member 26 centrally pivoted as by a bolt 26ª to said fixed member. A groove or rabbet is formed in the forward side of each pivoted member in which is placed a long narrow strip of any suitable material 27, such as rubber, that projects slightly below the under side of the pivoted member and to which is applied the adhesive material. A thin metal strip 28 is screwed against the member 26 to hold the stencil strip 27 in place. The stencils 24 are disposed parallel to the plates 18 and in line with each other, their inner ends nearly in contact, thereby forming a straight line of such length as will extend substantially across one end of a wrapper B when in position to be applied thereto. The stencil pads 27 are mounted in pivotal members 26 which permit their inner ends to yield and pass by any obstruction when the carriage is moving rearwardly, but they are held in operative position by means of a coil spring 29 connected with the outer end of each pivoted member and with a pin 30 projecting downwardly from each plate 18. The action of the springs on the pivoted members 26 are limited by a lug 25ª projecting from the under side of each fixed member 25 in front of said pivoted members near their outer ends.

Throughout this specification, glue will be mentioned as the adhesive material used, but paste, mucilage, or other suitable substance may be employed in place of glue, the latter however is considered superior.

Glue is applied to the wrapper in suitable spots on the face thereof between its ends and near the sides for sealing the wrapper around the package and the end flaps of the final fold. For this latter purpose pads or stencils 31, which may also be of rubber, are fastened on the under side of plates 32, each plate being connected with one end of an inwardly projecting arm 33 by a pivot pin 32ª and held depressed by a spring 32ᵇ. Each arm is provided on its opposite end with a flanged seat 34 slidably mounted on the cross bar 17 of the carriage 13 and held in adjusted position by a bolt 34ª extending through the seat 34 and a longitudinal slot 17ª in the cross bar. By means of these slots, the stencils 31 may be adjusted to suit the width of wrapper when packages of different sizes are to be wrapped on this type of machine. Longitudinal adjustment is obtained by moving the plates 18 carrying the stencils 24, said plates as will be noted, are fastened to the side bars 16 of the carriage by bolts 18ª the heads of which are seated in undercut longitudinal grooves 16ª in the upper face of said side bars. If the bolts 18ª be loosened, the plates 18 with the stencils 24 can be moved forwardly or rearwardly to suit the length of a wrapper. A scale 35 on each side bar 16 will be found convenient for setting the plates 18 when standard size packages are to be wrapped.

Motion is imparted to the carriage by mechanism now to be described.

Mounted in suitable bearings at the left side of the machine between the bed plate its inner end, thus elevating the rack 63 and through the gear 61, pawl 59ᵃ and ratchet wheel 58ᵃ, turns the shaft 53ᵃ and pinion 52ᵃ thereon, and, as said pinion is in engagement with the teeth on the post 14ᵃ, the wrapper table is drawn downwardly and the weight 55ᵃ raised. As soon as the depressed portion 66 of the cam disk 65 reaches, in its rotation, the roller 64ᵃ on the transverse lever 64, which occurs only at the time the carriage 13 is at rest above the wrapper table 14, the weight 55ᵃ is released and by its fall causes a quick elevation of said table and presses a wrapper against the gummed stencil pads 27 and 31 on the carriage 13.

In order that the wrapper bed or table 14 may be raised by the weight 55ᵃ quickly and freely at the proper time without hindrance from the lowering mechanism hereinbefore described, a lever 67 is provided which is pivoted at its inner end on a bracket 68 depending from the bearing 4ᵃ through which the post 14ᵃ slides, and carries on its outer end a roller 69 resting on a peripheral cam disk 70 keyed on the main shaft 36. Near the inner end of the lever 67 is a curved upwardly projecting finger 71 which lies close to the tail piece 72 of the pawl 59ᵃ and strikes said tail piece to disengage the pawl from the ratchet 58ᵃ when the lever is operated by the cam 70. This movement of the lever 67 occurs only when the cam 70 is in position to permit the weight 55ᵃ to fall and elevate the wrapper table. By thus disconnecting the pawl 59ᵃ, the shaft 53ᵃ with the ratchet wheel 58ᵃ and pinion 52ᵃ are free to turn independently of the other parts of the depressing mechanism when the wrapper table rises. The weight of the inner end of the lever 64 and of the rack 59ᵃ is sufficient to lower said rack 63 but less rapidly than the upward movement of said wrapper table. To insure the downward movement of the rack bar 63 a coil spring 63ᵃ is secured at one end to a pin projecting from said rack bar and at its other end to the bed plate 1. The downward movement of the rack 63 rotates the gear 61 and the disk 60 on which the pawl 59ᵃ is pivoted. As the curvature of the finger 71 on the lever 67 is concentric with the axis of the shaft 53ᵃ when the lever is elevated, the pawl 59ᵃ will be held away from the ratchet wheel 58ᵃ until the rack has dropped to its lowest position, after which the projecting surface on the cam 70 passes beyond the lever 67 and permits the latter to fall, thus withdrawing the finger 71 from the pawl 59ᵃ which latter immediately engages the ratchet wheel through the medium of a suitable spring. Just after the cam 70 has released the lever 67 the cam 65 acts on the transverse lever 64 and raises the rack bar 63, thereby lowering the wrapper table.

During the upward movement of the wrapper bed or table it is to be remembered that the carriage 13 was at rest immediately above it with its stencil pads 27 and 31 charged with glue. The movement of the table brought the uppermost wrapper into contact with these glued pads and when the table was lowered this same wrapper adhered to the stencils. The carriage being now supplied with a wrapper, it is drawn along the rails 15 by the sprocket chains 9, operated as previously described, until said carrier is brought over the wrapper folding device and then stops. Here the wrapper is released from the stencils and at the proper time returns for another wrapper, first passing over the gluing mechanism, hereinafter described.

The carriage 13 moves at a constant speed in its travel from one end of the machine to the other and is brought to an abrupt stop at the rear end of the machine above the wrappers and at the forward end of the machine above the wrapping mechanism. Were not some suitable means provided to avoid the shock occasioned by the sudden stoppage of the carriage, the parts forming the same would be displaced and other damage be done to the carriage, besides the great trouble that would be occasioned and the practical impossibility of properly registering the carriage when it stops. To overcome this difficulty, dash pots 73, Figs. 1, 2, 3 and 4, are fastened on the top of the bearings 6 which carry the shaft 7, and other dash pots 74 attached to the bearings 11 on which the sprocket wheels 10 rotate. Each rear corner of the carriage has fastened thereto a rearwardly extending bar 75 furnished at its outer end with a piston 76 while like bars 77 project forwardly from the carriage and are also provided with pistons 78. These pistons 76 and 78 enter the respective dash pot cylinders 73 and 74 and break the shock caused by the quick stop of the carriage. Each cylinder has a small hole 73ᵃ for the air to slowly escape therefrom and the usual check valve to permit the cylinders to rapidly fill when the pistons are withdrawn.

Referring now to the folding mechanism, it will be seen that the supporting plate 3 is formed with a central opening 80 for the packages to pass through while being wrapped, and provided on its upper surface with a pair of guides or ways 81 extending from said opening 80 to the front edge of the plate 3 and similar guides or ways 81ᵃ in line with those 81 running from the opposite side of said opening to the rear edge of the same plate. Between the pairs of guides 81, 81ᵃ are respectively mounted slides 82, 82ᵃ each having a longitudinal slot 82ᵇ for a fastening bolt 88, and also provided with an upright bracket 79 supporting a horizontal table, one being indicated by 83 and the other by 83ᵃ, the two tables being in the same plane. The slides are adapted to be moved in their guides 81, 81ª when their fastening screws are loosened, toward and away from each other for adjusting the distance between the adjacent edges 84 of said horizontal tables to the correct width or one dimension of the package or carton to be wrapped. Rollers 85 of equal length with the tables 83, 83ª are mounted at the side edges 84 of said tables, their ends being supported at the ends of the plates, in slidable bearings 86 backed by springs 87 which tend to force the rollers, to a limited extent toward each other and away from the table. These rollers 85 bear against the carton and its wrapper when pushed between said rollers and fold said wrapper around two opposite sides of the package as will be explained more in detail hereinafter. After the slides 82, 82ª have been adjusted to separate the horizontal tables 83, 83ª, the required distance, they are secured against movement by tightening the bolts 88, which, as previously stated, extend through slots 82ᵇ in the slides and are screwed into the supporting plate 3 as shown in Fig. 4.

Extended across the forward supporting plate 3 and some distance above the tables 83 and 83ª, as represented in Figs. 1, 2, 15 and 16, is an arched frame 90 bolted to said plate and provided substantially in its center with a vertically disposed guide-way 91 to receive a sliding bar or plunger 92 with a shorter cross bar 93 on its lower end at a right angle thereto and projecting equally on each side. The cross bar 93 is adapted to be moved downwardly with the sliding bar between the tables and into the throat H below the suporting plate 3. A bearing 94 on the top of the arched frame at the left side gives support to the hub 95 of a rocking lever 96 which projects toward the center of the arched frame and is there connected to the vertically sliding bar 92 by a link 97 pivoted to the lever and to the sliding bar. The pivotal connection between the lever and the link is an adjustable one for the purpose of setting the cross bar 93 a suitable distance above the package to be wrapped. An arm 98 projects from the hub 95 in a direction opposite that of the lever 96, from the end of which arm, a connecting rod 99 extends downwardly to the outer arm of a bell crank lever 100, the latter carrying on its opposite end a roller 101 engaging a cam disk 102 keyed on the main shaft 36. The elbow of the bell crank lever is fulcrumed in a bracket 103 bolted on the base plate 1, see Fig. 5.

Mounted to slide on the cross bar 93 are two heads 104 and 105, shown in detail in Figs. 21, 22, 23 and 24, one on each side of the vertical bar 92 and adjustable at varying distances therefrom. Each head 104, 105, is provided at its inner end with a wide flange 106 extending laterally on each side and two downwardly projecting legs 107 near said flange, to which legs are hinged a wing folding plate 108 by means of a pin 109 passing through the ends of the legs 107 and hinge lugs 110 projecting upwardly from said folding plate. A coil spring surrounds each pin 109 and is connected by one end to one of said legs, the other end rests on the folding plate and tends to hold the latter in a horizontal position. The bottoms of said legs are flat and form abutments to prevent the outer end of the folding plate from rising above the horizontal plane. The inner ends of the folding plates 108 project a slight distance beyond the hinge lugs 110 for a purpose to be described later.

Lying close to the rear side of the vertical sliding supporting rod 92 and pivoted in bearings at its upper and lower end is a polygonal shaft 111 carrying a pinion 112 fast on its lower end below the cross bar 93, and a second pinion 113 at the upper end of the guide 91, free to permit longitudinal movement of the polygonal shaft 111 therethrough but rotatable therewith.

In mesh with the fixed pinion 112 are two short racks 114, 115, one in front and the other at the rear of said pinion and held in place by a housing 116. Each rack is provided with a lug 117, see Fig. 22, to which lugs, rods 118 are fastened that extend in opposite directions immediately below the cross bar 93, one rod passing freely through the head 104 and the other through the head 105. A set bolt 119 in each head will secure the latter to its respective rod when tightened. Loosening the bolts enables the heads to be separated from each other any distance within the limit of length of the rods 118. After the heads have been secured to the rods 118 they may be separated a predetermined distance by revolving the polygonal shaft 111 which, through the fixed pinion 112, operates the racks 114 and 115 and thereby cause the heads to slide on the cross bar 93 through their connection to the rods 118.

The shaft 111 is automatically rotated at the proper time to separate the heads 104 and 105 by a rack 120, engaging and turning the loose pinion 113, operated by a link 121 connecting said rack with an upright arm 122 fixed on one end of a rock shaft 123 pivoted in bearings projecting outwardly from the top of the arched frame 90 below the bearing 94. A horizontal arm 124 on said rock shaft has a connecting rod 125 leading to a rocking lever 126 fulcrumed in a bracket on the base plate 1 and provided with a roller 127 in engagement with a peripheral cam 128 see Fig. 16 on the cam disk 102 keyed on the main shaft 36, see Figs. 2 and 3.

The cams 102 and 128 are so timed that the former operates first to depress the sliding bar or plunger 92 and push the package with its wrapper between the rollers 85 on the tables 83 and 83ᵃ into the throat H of the wrapping mechanism. During this movement of the plunger, the polygonal shaft 111 slides freely through the pinion 113, and as the heads 104, 105 are sufficiently close together to cause the inner ends of the folding plates 108 including their hinged connections, to overlap the ends of the packages, see Figs. 21 and 22, said plates will remain in horizontal position. For a purpose to be described hereinafter, the plunger will be temporarily withdrawn from the throat for a certain distance and then, after a pause, it will again enter the throat to its full depth. Before the plunger reaches the package for the second time, the cam 128 will have acted on the lever 126 which, through the connections described, will operate the rack 120 and cause it to turn the pinion 113, the polygonal shaft 111 and the fixed pinion 112 on the lower end of said shaft. The latter pinion will therefore project the racks 114 and 115 with their attached rods 118 and separate the heads 104, 105, as in Fig. 23 far enough to carry the hinged connections of the plates 108 outside the edge of the package, so that when the plunger once more descends, the inner edges of the plates when they strike the package will turn on their hinges and fold the projecting portions of the wrapper against the ends of the package as indicated in said figure.

After the carriage 13 has received a wrapper in the manner heretofore described, it is moved forward to the folding mechanism and stops just above the tables 83, 83ᵃ, with the wrapper spanning the space between them and beneath the package to be wrapped, which package may be placed directly on the wrapper, within a holder attached to the carriage 13, or preferably upon a support 375 fastened to some part of the frame A near the folding mechanism. This support will be described later.

Figure 35:
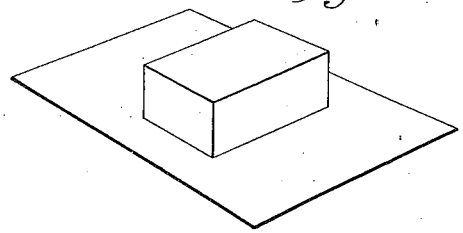
Figure 36:
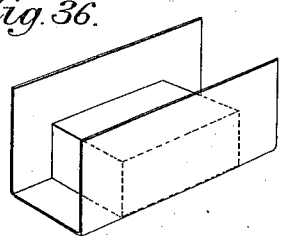

The descent of the plunger forces the package out of the holder 375 onto the wrapper, in the position shown diagrammatically in Fig. 35. This movement releases the wrapper from the stencils which latter leave on said wrapper spots of glue which in this instance consist of a strip on the forward end of the wrapper and a spot on each side at the edge in line substantially with the center of the package. The continued descent of the plunger forces the package between the rollers 85 on the inner edges of the tables 83 and 83ᵃ, which fold the wrapper against opposite sides of the package and smooth and stretch the same thereover; thus forming the first fold, the relative position of the package and wrapper being clearly represented in Fig. 36.

After passing between the tables 83, 83ᵃ, the package or carton and its wrapper enter the throat H and engage one or more upright brushes 135 or other frictional devices fastened by one end against the underside of said tables at their inner edges 84 and projected downwardly through the opening 80 in the supporting plate 3. The brushes are so disposed that their bristles project inwardly or toward each other and slightly within the lines of travel of the sides of the packages over which the wrapper is folded. These brushes 135 therefore hold the wrapper smoothly and tightly against the passing package which continues its downward movement past the lower ends of said brushes and between other brushes or friction means 136 situated immediately below. Here the plunger temporarily ceases its downward movement and begins to rise, traveling upward sufficiently high to clear the carriage so that the latter may be drawn backwardly to the wrapper table and pick up another wrapper. The stoppage of the plunger of course, halts the downward movement of the package and it is at this time that the second and third folds of the wrapper are made.

The second fold illustrated in Figs. 16, 18 and 19 consists in turning down the upstanding ends of the wrapper and sealing them over the upper surface of the package which is in fact the bottom thereof, but for the sake of clearness it will be referred to as the top or upper surface.

Parallel with the upstanding ends of the wrapper is a wing folder 137 at the front and 138 at the rear, each folder being mounted respectively on a rock shaft 137ᵃ and 138ᵃ pivoted in brackets 139 bolted on the supporting plate 3 at the front and rear margins of the central opening 80. Each wing folder 137, 138 may be made, as shown in Figs. 16 and 17 of three spaced sections to accommodate the brushes 135 which stand as the lines of travel of said wing folders. The left end of the rock shaft 137ᵃ is provided with a crank arm 140 projecting at a suitable angle above and forward of the rock shaft and connected by a link 141 to a shorter crank arm 140ᵃ on the shaft 138ᵃ, also extending forwardly but at an angle below its shaft. The connecting link 141 between the two crank arms is provided with a longitudinal slot 141ᵃ in which is fitted a sliding block 142 mounted on a pivot pin 140ᵇ projecting from the end of the shorter crank arm 140ᵃ. A rod 142ᵃ extends from the block 142 through the slot 141ᵃ in the link 141 and into a hole in the body of said link and holds in place under compression a spring 143 surrounding said rod and tending to keep the bearing 142 in the lower end of the slot, as shown in Fig. 15.

Pivoted to the crank arm 140 on the same pin as the link 141, see Fig. 2, is a connecting rod 144 extending rearwardly to the upper end of a vertically disposed rocking lever 145 fulcrumed at its other end on a bracket 146 bolted on the bed plate 1 near the inner side of a cam 147. Intermediate the ends of the lever 145 is a roller 148 fitted to run in the groove of the cam 147.

Now, when the cam 147 swings the lever 145 rearwardly, the connecting rod 144 and link 141 rock the shafts 137ª and 138ª toward each other and by means of the wing folders 137 and 138 thereon, the ends of the wrapper are turned down upon the upper face of the package. Because the crank arm 140ª is shorter than the crank arm 140 and is operated from the latter arm through the connecting link 141, the wing folder 138 moved by the shorter arm will travel faster and press the rear end of the wrapper on the package before the forward one. This is rendered necessary because the rear end of the wrapper is slightly longer than the forward end to the latter may overlap the former and bring its glued edge into contact therewith. When the rear folder 138 has moved as far as possible, the front folder 137 with the pasted end of the wrapper is still at an angle to the upper surface of the package, but the continuous rotation of the cam 147 finally closes the wing folder 137 and its wrapper end over the package and presses the line of glue against the previously folded end. The final movement of the folder 137 is brought about by the slotted end of the link 141 sliding over the block 142 on the crank arm 140ª and compressing the spring 143 between them. After sealing the wrapper ends, the cam 147 reverses the movement of the parts actuated by it and the wing folders 137 and 138 are raised once more to vertical position assisted by springs 137ᵇ and 138ᵇ, the folder 137 rising first at the beginning owing to the tension of the spring 143.

In addition to the wing folder 137 secured to the rock shaft 137ª there are two fingers 137ˣ, see Figs. 15, 17, 18 and 19, attached to the arms of a yoke 149 mounted to turn freely between the brushes 135 and the central section of the wing folder 137 or between said brushes and the outer sections of the folder. In the drawings they are shown between the brushes and the central section. Depending from the center of the yoke 149 is a lug 150 which, with the yoke itself, overbalances the fingers and holds them normally in vertical position, substantially parallel to the wing folder 137.

Projecting from one or both sides of the yoke 149 is a pin 151 which is adapted to be engaged by a pin 137ᶜ on the hub 137ᵈ of the folder 137 and cause the fingers 137ˣ to be turned down with said folder to fold the end of the wrapper over the package. The lug 150 will be raised to a horizontal position above a sliding bolt 152 when the fingers are turned down so that at the proper time said bolt will be pushed under said lug 150 and hold the fingers 137ˣ depressed after the folders are elevated. The fingers 137ˣ will remain in their depressed position on the package while the plunger is making its return movement and will continue in this position until the third folders have advanced, completed their folding operation and nearly finished their backward movement which will finally disengage the bolt 152 and permit the fingers to rise just in time to escape the plunger, as will be described later.

Figure 37:
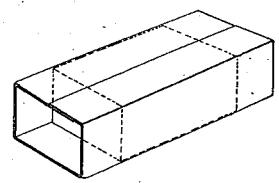

At the completion of the second folding operation the package and its wrapper will appear as represented in Fig. 37 which shows the wrapper folded and sealed in a tubular form and projecting equally beyond the ends of the package. The third operation folds or tucks in against the ends of the package the front and rear sides of the projecting portions of the wrapper so that the package will partake of the form illustrated in Fig. 38.

Integrally formed with or attached to the underside of the slides 82 and 82ª, as clearly represented in Fig. 15, are two brackets 155 and 156, the bracket 155 being on the forward slide 82. Each bracket terminates at its lower end in two legs 155ª and 156ª respectively, which legs 155ª of the bracket 155 are provided with bearings 155ᵇ through which a pair of horizontal rods 157 are adapted to slide. Like bearings 156ᵇ on the legs 156ª support similar horizontal rods 157ª. The two rods 157 are parallel to each other and are attached at their ends to a cross-bar 158, secured to which bar are two flat reciprocating tucker plates 159. In rear of the throat the two rods 157ª in line with the respective rods 157 are connected at their forward ends by a transverse rod 158ª which in turn support tucker plates 159ª. These four tucker plates are formed each with a slide 160 on its rear edge that partly surrounds the rods 158 and 158ª and are adapted to be moved longitudinally on the said rods to permit the tuckers 159 and 159ª being adjusted to the length of the package to be wrapped. After adjustment has been attained the tuckers are held firmly on the cross-bars 158 by means of bolts 160ª.

It may be well to repeat here that the tuckers are adjusted to the width of the carton by moving the slides 82 and 82ª, as previously described, and as the brackets 155 and 156 form a part of these slides, the various elements forming the tuckers and their connections must therefore move with said slides.

The lower ends of the legs 155ª are joined by a cross-brace 162, the outer ends of which are bolted to a cross-bar 163 parallel to the bar 158, while on the opposite side of the throat H the legs 156ª are also connected by a brace 162ª which supports a cross-bar 163ª parallel to the bar 163.

Forming the lower rear side of the throat H are two vertical plates 165 situated one on each side of the longitudinal axis of the wrapping mechanism, see Figs. 1 and 15, each plate being formed on its rear side with a slide 166 movably carried by the cross-bar 163ª; a like plate 167 faces each plate 165 and forms the lower front side of the throat H, these plates being likewise provided with a slide 168 movable on the cross-bar 163. The upper end of each vertical plate 165, 167, carries one of the brushes 136 which, it will be remembered, are placed below the brushes 135 and hold the package in place while the wrapper is being folded around it. Below each brush 136 a pressure plate 171 is supported by the lower portion of the vertical plates 165 and 167, which pressure plates 171 have attached to their upper and lower ends pins 169 projecting perpendicularly therefrom and slidably mounted in openings in the plates 165 and 167, being retained thereon by nuts, as shown. The plates 171 are continually forced inwardly by springs 170, which press said plates against the front and rear sides of the folded packages as they are forced downwardly through the throat. Lateral adjustment of the vertical plates 165 and 167 on the cross-bars 163 and 163ª is permitted by loosening bolts 172, which fasten the slides 166 and 168 to said cross-bars.

Pivotally mounted in bearings 174 bolted on the front of the frame is a transverse shaft 175 on which is keyed, or otherwise secured, an upright arm 176 pivotally connected by a link 177 to a lug 178 depending from a yoke plate 179 having a boss on each end through which the rods or bars 157 pass and are secured therein. Between the bosses on the yoke 179 is an upright flange 180 having a perforation therethrough for the passage of the rod 181 attached to the rear end of the bolt 152 and provided with a cross-pin 181ª in rear of the flange 180 and a short distance therefrom when the bolt is in its retracted position represented in Fig. 15, in which position, the forward end of the rod 181 abuts against a plate 181ᵇ, depending from the front edge of the supporting plate 3. A shaft 175ª similar to the shaft 175, extends across the machine in front of the central legs 2ᵇ and is mounted in suitable brackets 174ª fastened to the frame. Fixed on this shaft is an upright arm 176ª connected by a link 177ª with a lug 178ª depending from a cross plate 179ª fastened to the two parallel rods 157ª, the construction thus far being the same as the similar mechanism in front of the throat H. When these shafts are rocked inwardly or toward each other, the connections described cause the cross-bars 158, 158ª to travel toward the transverse center of the throat H for the purpose of advancing the tucker plates 159, 159ª which fold the sides of the projecting ends of the wrapper against the ends of the package, as described.

The means for rocking the shafts 175, 175ª will now be described.

Bolted to the under side of the supporting plate 3, as indicated in Figs. 2 and 15, midway between the shafts 175, 175ª, is a bearing 215 from which projects a horizontal stub shaft toward the folding mechanism. Mounted to rock on this shaft is a straight lever 216, centrally fulcrumed thereon, the arms of which lever are pivoted each to a connecting bar, one of which, 217, extends forward to an arm 218 on the shaft 175 and the other 217ª extends in the opposite direction to a similar arm 218ª on the cross-shaft 175ª. Also pivoted to the lower arm of the lever 216 on the same pin which passes through the connecting rod 217 is a rearwardly extending bar 219, pivotally connected with the upper end of a rocking lever 220, fulcrumed at its lower end on a bracket 146, and provided with a roller 221 engaging a cam 222, which on rotating, swings the lever 220, whence through the extending bar 219, the lever 216 and connecting rod 217, 217ª, the cam imparts the required motion to the shafts 175, 175ª for operating the tucker plates 159, 159ª.

It is to be remembered that the fingers 137ˣ are pressing upon the package when the tucker plates 159, 159ª begin to advance. These fingers will continue to press on the package after the wing folders 137, 138 have risen and until the tuckers have completed their work and are nearly retracted. It should also be remembered that when the fingers 137ˣ were depressed the lug 150, forming a part thereof, was elevated above the bolt 152. As soon therefore as the tuckers began to advance, a spring 181ᶜ acts on the bolt 152 and slides it beneath the finger 150, thereby locking the fingers depressed after the holders had risen. The fingers will, therefore remain down until the ends of the wrapper have been tucked and the tucker plates almost wholly withdrawn, when the flange 180 will strike the pin 181ª projecting from the rod 181 and withdraw the bolt from beneath the lug 150, thus permitting the fingers to be raised by the weight of the yoke 149 and lug 150, just before the plunger reaches them.

Figure 38:
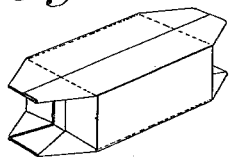
Figure 39:
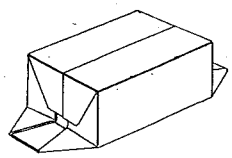
Figure 40:
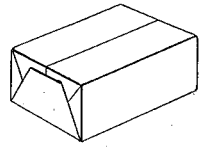
Figure 41:
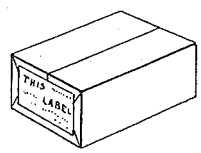

The tucker plates, of which there are four in number, have their advancing ends curved from above downwardly and bent slightly outward away from the package so that when they strike the projecting side portions of the wrapper at the corners of the package they will fold in these portions smoothly and evenly and cause them to lie close against the package, as represented in Fig. 38. The tucker plates remain in advanced position for a short time, or until the plunger has nearly completed its descent and the inner ends of the folding plates 108 thereon are in contact with the top of the package. It will be remembered that at this time the heads 104, 105 on which the folding plates 108 are pivoted have been moved outwardly so that the pivotal axes of the plates lie without the ends of the carton; the further downward movement, therefore, of the plunger will cause these plates to tip in the manner shown in Fig. 23 and fold the projecting portions of the wrapper at the top of the package, flat against the end of the same, as in Fig. 39. The pressure on the package at this time is sufficient to depress it between brushes 185, 186 which are here shown lying adjacent the ends of the package but below them, and which serve to fold up the remaining or bottom flaps of the wrapper. Before these flaps are brought against the sides of the package the folding plates or wing folders 108 on the plunger have been elevated so that the lower flaps, on each of which is a patch of glue, will be pressed against the downwardly turned flaps and seal the wrapper in place, thus finishing the operation of folding. The package as thus completely folded is clearly represented in Fig. 40.

The plunger descends through the throat H sufficiently far to disengage the package from the brushes 136 into the grasp of the spring sustained plates 171, after which the plunger rises to its full height and there rests until the carriage 13 advances with another wrapper and another package has been placed in the package holder. Previously wrapped packages held within the grasp of the plates 171 are, of course, forced downwardly with every newly wrapped package, the lowermost one falling onto a discharge trough 188, represented in Figs. 2, 5, 15 and 16, comprising a flat bottom 189 supported in horizontal position by a cross brace 190 bolted to the inner side of the front legs 2ª, and its rear end, which extends behind the throat H, supported on an arched bracket 191 screwed to the base plate 1. The left side of the trough is formed by a plate 192 provided with outwardly projecting pins 193 slidable through openings in a bar 194 and held thereon by nuts or other means to prevent the pins from being withdrawn. The bar 194 is bolted to a bracket 190ª attached to the inner upper side of the cross brace. Surrounding the pins 193 between the plate 192 and bar 194, are coil springs 195 which tend to keep the plate 192 pressed inwardly. The opposite or right side of the trough 188 is formed of a vertical plate 196 secured to the cross-brace 190 by a bracket 190ᵈ, said plate being provided on its inner side at its upper and lower edges with strips 197, between which are supported rollers 198 mounted on vertical pins 199 secured in the strips 197.

The packages are forced intermittently along the trough 188 by means of a kicker 200 comprising a horizontal arm 201 adapted to be rocked on a vertical pivot supported in a bracket 202. The inner end of the arm 201 has pivoted thereto a plate 203 adapted to bear against the rear of the last box entering the trough and force it and those in advance thereof in a forward direction. The outer end of the arm 201 is connected by a universal joint to a rod 204 having its other end attached by a pin to a downwardly extended arm 205 fixed on a rock shaft 206 supported in bearings projecting forwardly from the front of the supporting plate 3. A second arm 207 also fixed on the shaft 206 is operated by a connecting rod 208 pivoted thereto and extending rearwardly where it is joined on the upper end of a vertically disposed lever 209 fulcrumed at its lower end on a bracket 210 bolted to the bed plate 1. Between the ends of the rocking lever 209 is a roller 211 which enters the groove of a cam 212 mounted on the main shaft 36. As the shaft 36 rotates, the cam groove 212 will rock the lever 209 and through the connecting rod 208 and arm 207, impart a rocking movement to the shaft 206, which through the arm 205 on said shaft and connecting rod 204 will operate the kicker 200 and cause the plate 203 thereon to swing forward and push the folded and sealed package along the trough from beneath the throat H and then to retract into position to act upon another box when it descends into the trough. A stop 215ª is fastened on the rear end of the trough 188 to form an abutment for the kicker plate 203 in its rearmost position.

Referring now to the device D for applying adhesive material to the stencils 27 and 31 on the carriage 13, attention is directed to Figs. 1, 3, 13 and 14. As there clearly represented the glue fountain or device D is shown intermediate the ends of the machine and consists in part of two vertically disposed side frames 216ª, 216ᵇ bolted on the forward end of the supporting plate 4, one on each side and close to the rear end of the supporting plate 3. Mounted to rotate in bearings formed on the side frames 216ª, 216ᵇ is a cross shaft 217ᵇ to which is fixed a roll 218ᵇ extending between said frames and adapted to enter a glue holding pan 219ª of suitable size and shape, supported on pins 220ª projecting inwardly from the side frames, which enter slotted lugs 219ᵇ depending from the corners of the pan 219ª. The construction is such that the pan 219ª may be readily inserted and removed from its supports without disturbing other parts of the device. Should the adhesive material be glue or other material requiring heat to liquefy it, any desired form of heating apparatus may be placed beneath the pan 219$^a$ as will be understood.

The roll 218$^b$ may be made of any material desired, but a hollow metal roll is preferred, said roll being rotated with its underside in the glue by means of a sprocket wheel 221$^a$ fixed on the right end of the shaft 217$^b$ and overlying the edge of the supporting plate 4. A driving sprocket wheel 222$^a$ is secured to a short cross shaft 223 arranged to turn in bearings 224 bolted to the bed plate 1, and driven by a belt pulley 225 mounted to turn freely on said shaft and adapted to be coupled thereto by a clutch 226 of any preferred type, operated by a hand lever 227. Motion is imparted to the glue roll 218$^b$ by means of a chain 221$^b$ passing around the sprocket wheels.

In contact with the rear of the roll 218$^b$ is a doctor roll 218$^c$ for evenly distributing the glue over the roll 218$^b$. The doctor roll 218$^c$ is removably mounted at its ends in pivoted bearing plates 218$^x$ secured to the side frames and held against the roll 218$^b$ by threaded pressure screws 216$^g$ supported in fingers 216$^h$ extending upward from the frame plates as shown. The pressure screws 216$^g$ are turned by finger pieces on their outer ends, and held locked by nuts 216$^d$. The doctor roll is driven by gear wheels as shown.

The tops of the side frames 216$^a$, 216$^b$ form supports for the rails 15, immediately below which is a cross bar 228 connecting together the upper ends of said side frames. Mounted to rock on said cross bar 228 is a sleeve 229 extending from side to side of the frame. On each end of said sleeve 229 is a rearwardly projecting arm 230 provided with a bearing, in which bearings a shaft 231 is journaled, parallel with the shaft 217$^b$ and on which is fastened a roll 232 of substantially the same size as the glue roll 218$^b$ but preferably made of rubber, or with a rubber surface 232$^a$. Normally, the two rolls are in contact, the tilting roll 232 being rotated by the roll 218$^b$ through a gear wheel 218$^y$ on its shaft turning a gear wheel 232$^b$ on the left end of the other roll, and receives glue therefrom; but when the tilting roll 232 is raised from the roll 218$^b$ sufficiently high, it contacts with the stencils on the carriage 13 and covers their faces with glue.

The roll 232 is tilted by means of a cam 233 keyed on the main shaft 36, actuating a roller 234 pivoted on the outer end of a transverse lever 235; while its inner end is carried in a bearing 236 bolted to the under side of the supporting plate 4. A connecting rod 237 extends from a suitable intermediate point on the lever to an ear 238 on the forward side of the sleeve 229. From this, it is clear that as the cam rocks the lever, the roll 232 will be raised to the height of the stencils and lowered into contact with the glue roll 218$^b$. The arrangement of the cam 232 in connection with the transverse lever 235 is such that the gluing roll 232 will be elevated into contact with the stencils, only when the carriage 13 is moved rearwardly across the gluing device D, and held in its lowered position during the forward travel of said carriage with or without a wrapper attached.

To prevent the wrapper from coming into contact with any part of the gluing device D which may contain glue as it passes thereover, a horizontal plate 239 extends parallel to and above said roll, provided on its upper surface at the extreme ends with sockets 240, slidable on parallel rods 241 extending rearwardly from the upper end of standards 242 bolted to the rear edge of the supporting plate 3. A fixed inclined plate 243 extends rearwardly from the slidable plate 239 over the glue font or pan 219$^a$ and is adjustably fastened to uprights 244 rising from the supporting plate 4. Whenever the roll 232 is elevated, the horizontal plate 239 moves forwardly a sufficient distance to permit the roll to pass, when the roll descends, the plate returns to cover the roll.

The movement of the plate 239 is produced by the oscillation of the rocking sleeve 229. An arm 245 projects forwardly from one end of said sleeve 229 and is connected through the medium of a link 246 with a lever arm 247, fast on a cross shaft 248 journaled in both of the standards 242. The shaft 248 is provided with lever arms 249 joined by links 250 with hinge lugs fastened on the forward edge of the sliding plate 239. From the above description it will be understood that as the sleeve 229 is rocked to elevate the gluing roll 232, the arm 249 will depress the lever arm 247 and rock the shaft 248. This will cause the lever arms 249 to draw the plate 239 forwardly and open a space for the roll to project through. A reverse movement of the sleeve returns the plate to normal position, thus entirely covering the gluing device D.

In addition to the means hereinabove described for mechanically and automatically wrapping and sealing packages, is a mechanism which forms a part of this invention and operates in correlation therewith for pasting a label on one or more sides of the wrapped package or carton. The mechanism used for this purpose is clearly illustrated in Figs. 1, 5, 15, 16, 29, 30, 31, 32, 33 and 34. The numeral 251 indicates a short endless belt mounted on a pair of drums 252 of equal size, their shafts being supported in bearings formed at opposite ends of a frame 253 bolted transversely on the bed plate 1 just in front of the leg 2ᵇ on the right side of the machine. On the shaft 254 of the inner drum 252 is a fixed ratchet wheel 255 and a loosely swinging arm 256, the latter being provided with a pawl 257 in engagement with said ratchet wheel for intermittently rotating the drums and moving the belt inwardly step by step to bring the labels, placed thereon at its outer end, into position at its inner end where they can be removed by suitable means and glued to the packages. An adjustable guide 258 is fixed at the outer end of the endless belt 251 against which a label is placed when the belt is stationary. At each intermittent movement of the drums, the belt advances a predetermined distance carrying the labels with it and then pauses, thereby giving time for placing another label on the belt. Each step by step movement of the endless belt occurs once during every complete cycle of operations of the wrapping machine, as motion is conveyed to said belt by a cam on the main driving shaft 36 through means hereinafter described.

Bolted against the inner side of the leg 2ᵇ near the endless belt 251 is a horizontal guide piece 259, formed with a longitudinal groove in its inner face to receive a bar 260 adapted to slide therein and be held in place by overlying plates 259ᵃ on the guide piece. Fastened to or integral with the slide bar 260 is a head block 261 projecting outwardly from said bar at a right angle thereto, said head block having a longitudinal slot extending inwardly from its forward face to receive a lug 262 of like shape formed on the rear side of a carrier frame 263, said lug being fastened to the head block by one or more bolts 264 to hold the carrier frame firmly in place. The lug 262 has slotted bolt holes that permit longitudinal adjustment of the carrier frame 263. Slidably mounted in the carrier frame 263 is a suction head 265, sustained therein by bolts 266 passing freely through holes in a plate 267 resting on the top of the carrier frame and surrounded by coil springs 268 which bear on said plate 267 and against the heads of the bolts. The tension of the springs tends to hold the suction head 265 in its elevated position, but it may be depressed when the bolts are forced downwardly. The suction head 265 is hollow and without openings thereinto except for a number of small holes 269 in the bottom and an inlet opening 270 in the side, in which latter is fixed a flexible air pipe 271 attached to the terminal of a metal tube 272 leading from a suction pump 273 on the rear end of the bed plate 1. The piston of the pump 273 is operated by a cam 274, rocking a bell crank lever 275 fulcrumed on the main frame A, the inner end of said lever is connected in turn with the upper end of the piston rod. At the proper time the cam rocks the bell crank lever to raise the piston, this withdraws the air from the suction head and thereby produces a suction through the small holes 269 in the bottom of said head. The bar 260 carrying the suction head 261 is moved longitudinally of the machine in its guide 259 by a depending arm 284 pivoted thereto, said arm being mounted on a shaft 285 extending across the machine between the legs 2ᵇ and journaled near its ends in bearings 2ᵉ integral with or attached to said legs and an approximately central bearing 4ᵉ. The extreme ends of the shaft 285 extend through the legs 2ᵇ and project a short distance beyond their outer sides. A shorter arm 284ᵃ also depends from the shaft 285 intermediate its bearings with which arm a rearwardly extending rod 284ᵇ is pivoted at one end and at its other end said rod is pivotally connected with the upper end of a vertical lever 286 journaled at its lower end on a bracket 286ᵃ. Intermediate the ends of the lever 286 is a roller engaging a cam 287 keyed on the main shaft 36. As the shaft 36 rotates, the cam 287 at the proper time and through the connections described, moves the bar 260 with its suction head in a forward and backward direction. When approaching the end of its rearward movement the heads of the bolts 264 on the suction head slide under a cam plate 276, fastened on the end of a bracket 277 bolted to the leg 2ᵇ, and depress said suction head into close proximity to the endless belt 251 upon which lies a label face downward. The movement of the suction head is arrested at the forward edge of the endless belt over one end of the label, and, as it has been forced downwardly close to the endless belt in the manner described, the inrush of air through the small holes 269 draws the end of the label into contact with the bottom of the suction head and holds it securely by the partial vacuum produced by said pump 273 until the suction ceases from the stoppage and return movement of the piston in the pump. The further operations of suction head and the sliding bar 260 will be taken up later on.

Secured on the bed plate 1 in a suitable position with relation to the endless belt 251, see Figs. 5, 15, 16, 25, 26, 31 and 32, is an upright bearing 278 in which a slide plate 279, provided with a head 280, is adapted to be reciprocated in a vertical direction. A slot 280ᵃ extends horizontally through the head 280 from end to end for the reception of bolts which adjustably fasten two links 281 and 282 on the left end of the slide plate head 280. The outermost link 281 is of fixed length and pivoted at one end on a block 283 secured on the head 280, said block is preferably adjustable on the head 280 to any suitable position by first loosening the attaching bolts which pass through the slot 280ᵃ. The other end of the link 281 is pivoted to the lever 256, which, through its ratchet and pawl connection, intermittently rotates the inner shaft 254 with its drum when the head is raised and lowered, thus imparting a step by step movement to the endless belt 251.

It is desirable that some means be provided for correctly positioning the labels so that they will be in accurate register with the suction head when the latter is depressed to pick up one of them. For this purpose the registering device, see Figs. 33 and 34 now about to be described may be employed.

Mounted to turn loosely on the end of the shaft 285 that projects from the right side of the machine is a rocking lever 288 the arms of which extend in opposite directions from its axis of oscillation. The upper arm 289 has a block 289ᵃ pivoted on its end, through which block runs a headed pin 290ᵃ attached to the rear end of a rod 290 reaching to the front end of the machine. Surrounding the pin 290ᵃ between its head and the rear side of the block is a coil spring 290ᵇ that forms a yielding sliding connection between the rod 290 and the block 289ᵃ. The lower arm 291 of the rocking lever 288 is provided on its end with a rearward lug 291ᵃ adapted to engage with the upper end of a second rocking lever 292 pivoted near its lower end on the leg 2ᵇ. The extreme lower end of said rocking lever 292 is connected adjustably with a horizontal slide 293 mounted in a guide 294 fastened to the leg 2ᵇ and carries on its forward end a strip 295 turned inwardly at a right angle to said slide and parallel with the upper inner edge of the endless belt 251, said strip having a depending portion 295ᵃ, in line with the suction head 265 and the innermost label on the endless belt. A finger 258ᵃ lies across the top of the endless belt 251 at its inner end to form an abutment for the labels as they are transported by said belt and stop them in the exact position with relation to the suction head in its rearmost position. The slide 293 has a slot 293ᵃ for the pin bolt 293ᵇ by means of which said slide is connected with the rocking lever 292 to permit the adjustment of the slide to the length of the label. The slide is normally held in its rear position by a spring 296 attached to the upper end of the rocking lever 292 and to a pin in the leg 2ᵃ. The limit of movement of the rocking lever under the tension of the spring is determined by a stop pin 297 projecting from the leg 2ᵃ.

The transverse shaft 206 supported by bracket bearings in front of the machine and which is oscillated by the cam 212, as previously described, has depending from its right end an arm 298 with which the forward end of the rod 290 is connected by a pin 298ᵃ passing through a longitudinal slot 290ᶜ in the rod. If now the shaft 206 be rocked so as to swing the arm 298 to the right, from the inoperative position shown in Fig. 33 to that shown in Fig. 1, the pin 298ᵃ after traversing the slot 290ᶜ will move the rod 290 in the same direction. As the other end of the said rod is connected to the rocking lever 288, it will therefore, rock said lever the lower end of which striking the lever 292, will cause the latter lever to move the slide 293 and the strip 295 thereon toward the endless belt, so that said strip will push the label on said belt into exact position below the suction head, should it extend too far rearwardly. A reverse swing of the lever 298 will return the parts again to inoperative position, the lever 292, slide 293 and strip 295 being drawn back by the spring 296.

The final operations for labeling the cartons or packages consist in applying glue on the backs of the labels and then attaching them in proper place on the cartons. This mechanism which will now be described, is illustrated in detail in Figs. 29, 30, 31 and 32.

Between the front leg 2ᵃ and the intermediate leg 2ᵇ on the bed plate 1 at the right side thereof is placed the label gluing and applying mechanism, which comprises in part, a horizontal plate 300 mounted to slide transversely of the machine, on ways formed on ribs 301 preferably integral with the base plate. Carried by the plate 300 and slidable in guides thereon at a right angle to its movement is a second or base plate 302 on which the operative mechanism is directly supported. A bolt 302ᵃ extends through a slot in the plate 302 to fasten the same after adjustment.

Bolted on top of the longitudinally movable base plate 302 at each side is a frame 303 on which are formed bearings for a transverse shaft 304 carrying a glue roller 305 between said frames. A gear wheel 306 is fixed on the outer end of said shaft 304 and a larger gear wheel 307 on its inner end. Meshing with the gear wheel 307 is a like gear 307ᵃ rotatable on a stud 308ᵃ projecting from the outer face of the inner side frame 303. A bevel gear 308 is rigid with the gear 307ᵃ and driven by a like gear 309 on the forward end of a horizontal shaft 310, perpendicular to the shaft 304, and journaled in bearings 311 mounted on the base plate 302. The rear end of the shaft 310 is connected by a universal joint 310ᵃ with one end of a telescopic shaft 312, the opposite end of which has a universal connection with a short shaft 313 turning in the bearing 216ᵇ bolted to the bed plate 1 as represented in Fig. 5. On the short shaft 313 is a gear wheel 314 meshing with a like gear 315 on a shaft also journaled in said bearing 216[b]. A bevel gear 316 on the rear end of the latter shaft engages a bevel gear 317 on the inner end of the shaft 223 which carries the sprocket wheel, that through a chain, rotates the gluing mechanism for the wrapper as heretofore described. From this it is to be noted that both gluing mechanisms are driven by power imparted to the shaft 223 through the belt pulley 225 or otherwise.

Beneath the glue roll 305 is placed a removable glue pan or font 318 supported on pins 318[a] in a manner similar to the glue pan or font 219 for the wrapper gluing mechanism.

At the top of the right side frame 303 is a guide 319 having a channel therein for a slidable bar 320, on the rear end of which is a fixed bearing 321 for the outer end of a rotatable shaft 322 of a glue distributing roll 323 parallel to and adapted to be brought into contact with the main glue roll 305. It is to be noted that the inner end of the roll 323 is without bearing for a purpose to be described later. The forward end of the slidable bar 320 is slotted horizontally at 320[a] for adjusting the connection of said bar with the lower end of the arm 298, whereby the position of the roll 323 may be varied within the limits of said slot. The lower end of the arm 298 is cut away on its front side to form a recess 298[b] in which a pin 324, adapted to be fixed at any point in the slot 320[a], may enter and be held therein by a sliding bolt 325 movable in a guideway formed in a fitting 326 on the front of the arm 298 above the recess 298[b]. The upper end of the sliding bolt 325 is bent outwardly to enable the bolt to be grasped and raised and lowered. Notches 325[a] are cut in the front of the bolt 325 for the reception of a spring catch 326[a] which enters one of said notches when the bolt is raised. A simple means for operating said bolt is shown in Fig. 33 and comprises a sliding rod 298[c] slotted at 298[d] for bolts which are screwed into an inclined bracket 298[e] fastened on the front end of the supporting plate 3. The lower end of the sliding rod is provided with a lateral fork, shown in dotted lines, between which the outwardly bent upper end of the bolt 325 enters when the arm 298 swings forwardly. A lever 298[f], pivoted on the right leg 2[a] has one arm connected to the sliding rod 298[c], and the other arm formed into a handle which, when depressed will raise the sliding rod and the bolt 325 if engaged therewith.

When it is desired to operate the folding machine without using the labeling mechanism, the sliding bolt is raised so that the arm 298 may swing without operating the bar 320; but if labels are to be attached to packages, the bolt 325 is pushed down to confine the pin 324 in the recess 298[b] so that, as the arm 298 moves back and forth the bar 320, with the distributing glue roll on its opposite end, slides in unison therewith.

A "doctor" roll 327 is mounted in swinging bearing plates 328 and forced against the glue roll 305 by screws 329 in a manner similar to the "doctor" roll on the wrapper gluing apparatus.

Longitudinally in line with the suction head 265 in the direction of its travel and slightly below the plane of its lower face is a hollow platen 330, from which the contained air may be exhausted, adjustably fastened in a horizontal position on fingers 331 projecting from an arm 332 mounted to swing to a vertical position on a rock shaft 333 supported in bearings 334 on a bracket 335 adjustably bolted to the base plate 302. The platen 330 is hollow and resembles a closed box through the upper face of which are formed two rows of small holes 330[a] and 330[b], the former at the front and the latter at the rear of the platen. The rock shaft 333 lies parallel to and above the shaft 310 and carries a crank arm 336 from one side of which a pin 336[a] projects for connection to the lower end of the link 282 which may be varied in length, the upper end of said link, it will be remembered, being adjustably fastened on the head 280 of the vertically movable slide plate 279, heretofore described. The movement of the slide plate 279 and the consequent swinging of the platen 330 from a horizontal to a vertical position, as well as the intermittent movement of the endless belt 251, is caused by the rotation of a cam 337 keyed on the main shaft 36 and operating an angular lever 338, fulcrumed at its angle in a bracket 338[a] on the bed plate 1, and carrying a roller 338[b] engaging the cam. The opposite end of the angular lever 338 has a long slot 339 therethrough for a pin 340, on which is mounted to turn, a block 341 fitted to slide in said slot 339. The pin 340 projects from the rear of the slide plate 279 through a vertical slot 278[a] in the upright bearing 278.

The fingers 331 are slotted longitudinally, see dotted lines in Fig. 29, for the passage of fastening bolts 342 on the under side of the platen 330, thus permitting the latter to be adjusted across the line of travel of the suction head 265, also the substitution of a larger or smaller platen when desired. Adjustably secured on the base plate 302 below the platen 330 is a bracket 343 which carries an upright stop pin 344 that serves as a rest for the platen when in normal position. A bridge 345 extends between the fingers 331 and is enlarged centrally to contact with the stop pin 344.

A post 346 rises from the base plate 302 in rear of the platen 330 and supports a downwardly inclined plate 347, the forward edge of which is placed close to the upper face of the platen.

Below the forward end of the supporting plate 4 at its right side is secured a suction pump cylinder 348 containing a piston connected to a piston rod 349 extending across the machine and pivoted at its end on an upright lever 350 fulcrumed on a lug projecting from one of the bearings of the worm shaft 37. A roller 351 on one side of the upright lever 350 is operated by a cam 352 on the main shaft 36. It follows therefore, that when said shaft turns the cam, the piston is moved in the pump cylinder 348. A pipe 353 leads downwardly from the base of the cylinder 348 nearly to the bed plate 1 and is there connected to a flexible tube 354 leading to a nipple 355 projecting from one side of the platen 330.

As soon as the suction head 265 has picked up a label, it is moved forwardly until said label lies wholly over the platen 330 and very close to it. At this moment the pump 348 is operated to withdraw air from the platen 330 and at the same time the suction operation of the pump 273 is discontinued and stops the exhaust through the suction head 261 with the result that the label will be held closely against the smooth flat upper face of platen by the suction through the small holes 330ª, 330ᵇ. The slidable bar 320 now begins to move rearwardly, carrying the glue roll 323 over the label on the platen 330, the under side of said roll just contacting with the label and leaving thereon an even coat of glue. The roll continues its rearward movement, past the inclined plate 347 before it begins to return. During this period, the cam 337, through the connections described, draws the slide plate 279 downwardly and operates the rock shaft 333, quickly swinging the arm 332 and the platen 330 thereon to a vertical position, there being no support or bearing for the inside end of the glue roll 323 to interfere with this movement of said arm. The label of course will be carried with the platen and pressed against the end of the bottom carton in the throat H, the label adhering to the wrapper of the carton, see Fig. 32. After holding the wrapper in place for a moment the rock shaft is turned in the opposite direction by the cam 337 and the platen returns to normal position.

The suction through the holes 330ª may not at all times be sufficient to prevent the label from adhering to the glue roll when passing thereover; therefore, a mechanical device has been designed to hold the extreme forward end of the label in place during the act of gluing. This device embraces a cross shaft 356 journaled in the side frames 303 below the forward end of the platen 330. Adjustably fastened on the cross shaft 356 are preferably two clamp blocks 357 on each of which is pivoted a slide 358 for the lower end of a clamping finger 359, which fingers pass some distance through the slides 358 and have their lower ends surrounded each by a spring coil 360 held under tension between the slides 358 and washers and pins 361, nuts or other means on the extremities of said fingers. The upper ends of the fingers 359 are provided each with a projecting spring tip 362 adapted, when the shaft 356 rocks to project over the forward end of the platen 330 and press on the label thereon. Indentations 363 are preferably made in the upper face of the platen 330 for the spring tips 362 to enter so that the glue roll may pass over them without contact therewith.

The shaft 356, which carries the fingers 359 is operated by the movement of the slidable bar 320 in the following manner: Below the bar 320 and fastened thereto by brackets 364 is a horizontally disposed cam plate 365, parallel to the bar 320 and having its lower edge at both front and rear ends cut away to form cam surfaces 365ª and 365ᵇ. Secured on the shaft 356 outside the frame plate 303 is a radially disposed lug 366 that projects upwardly and forward of its axis, with a bell crank lever 367 pivoted on the end thereof, one arm 368 of said bell crank lever projects in line with said lug 366 and is furnished at its outer end with a roll 400 situated at a short distance in front of and above the bottom edge of the cam plate 365 and adapted to be engaged by said cam plate. The other arm 369 of the bell crank lever 367 extends rearwardly and is connected by a spring 370 with the lug 366, or the hub thereof. A stop 371 on the lug 366 below the arm 369 limits the movement of the bell crank lever in one direction so that, normally, the arm 368 forms a continuation of the lug 366.

As thus far described, when the slidable bar 320 with the glue roll 323 starts to move rearwardly, the rear end of the cam plate 365 engages the roller 400 on the bell crank lever 367 and rocks the shaft 356, swinging the fingers 359 against the platen 330, so that the spring tips 362 project thereover and over the extreme end of the label. The continued movement of the cam plate 365 carries the lug 366 still farther to the rear, turning the shaft 356 and the adjustable blocks 357 thereon which latter, through the slides 358, press on the coil spring 360 and draw the fingers 359 downwardly so that the spring tips 362 on their upper ends press on the label and force a small portion of its end into the indentations 363 and hold the label firmly through the tension of the coil springs 360. By this time the finger 366 has been swung far enough to the rear for the roller 400 to ride on the lower edge of the cam plate 365, the parts operated by the shaft 356 remain in this position until the forward end of the cam plate releases the roller 400. The glue roll 323 in the meanwhile has passed over the label, and as soon as it reaches a point a short distance beyond the rear of the platen 330, the forward end of the cam plate passes off the roller 400 and releases the lug 366. The coil springs 360 now react and raise the spring tips 362 from the label so that the platen can be elevated, said springs at the same time tend to return the shaft 356 and the elements mounted thereon to their normal or inoperative position. When the bar 320 moves forward, the cam plate 365 strikes the roller 400 and moves the lug 366 to normal position, if not already there, against an adjustable screw stop 372. When said lug 366 strikes the screw stop 372, the cam plate 365 rocks the bell crank lever 367 so that said plate can pass over it thereby tightening the spring 370 which returns the bell crank lever to its normal position as soon as the cam plate releases it.

Returning now to the device 375 for feeding packages to the machine, attention is directed to Figs. 2, 25, 26, and 27. In these figures 376 indicates an endless belt situated at the left of the machine near the leg 90ᵃ of the arched frame 90 and overlying the rails 9 and the carriage 13 on said side of the machine. A guide bar 377 lies transversely of the belt and over the carriage and extends for a considerable distance beyond the belt. There is a stop 378 on the end of the guide bar 377 against which the packages abut when moved from the belt into position above the carriage. The guide bar 377 projects beyond the supporting plate 3, at one side and is secured by any suitable means to the frame A of the machine. A second guide bar 379 parallel to the guide bar 377 is also supported by the frame A and extends from the outer edge of the endless belt 376 beyond the supporting plate 3 to the same distance as the guide bar 377. These guide bars lie in a horizontal plane and are separated from each other any suitable distance, preferably about the width of the package to be wrapped. Alined with the guide bar 379, on the other side of the endless belt is a third guide bar 380 supported in any suitable way, as for instance from the arched frame 90. A pusher head 381 is mounted to slide horizontally between the guide bar 377 on one side and 379, 380 on the other, across the endless belt and over the carriage 13 as far as the stop 378, for the purpose of delivering a package from said endless belt in a correctly registered position above the wrapper and wrapping mechanism. The endless belt 376 is driven continuously or intermittently by any means, not shown, for bringing the packages placed thereon in front of the pusher 381, the guide bar 377 forming an abutment to prevent the packages passing beyond the pusher should the endless belt be driven continuously. The ends of the guide bars 379, 380, near the endless belt, are preferably deflected therefrom, as shown, for the purpose of straightening a package should it be placed on the belt in an irregular position. Beneath the guide bars 377 and 380 and projecting inwardly are movable supports 382 to uphold a package until acted upon by the plunger 92, when said supports will be forced from beneath the package and permit the latter to descend into the throat H of the feeding mechanism. Fixed supporting ways 383 may be attached to the aforesaid guide bars to prevent the end of a package from dropping below the outer ends of the movable supports before reaching them.

Fastened on the top of the arched frame 90 on the outside of the leg 90ᵃ is a bearing 384 in which is journaled a short shaft 385 carrying on its forward end a depending arm 386, preferably forked at its lower end, which engages by means of a link 387 with the pusher head 381. On the opposite end of the shaft 385 is an arm 388 connected by a rod 388ᵃ with a lever 389 fulcrumed at its opposite end in a bracket attached to the bed plate. A roller 390 on said lever 389 engages a cam 391 on the main shaft 36. By means of these connections the arm 386 operates the pusher head 381 to slide the package in front of it across the endless belt 376 and over the carriage 13 to the stop 378. The pusher head then returns to its inactive position on the outside of the endless belt ready for the next operation. At the proper time the plunger will descend and drive the package into the throat as heretofore described.

It will be understood that this machine is designed to wrap packages of different sizes, as the parts appertaining to the wrappers, package feeding and the wrapping mechanism are made adjustable within certain limits, as is also the label applying mechanism. It will also be noted that labels may be applied to either side of the package by placing the labeling mechanism on the desired side, or a labeling mechanism may be placed on each side when labels are to be applied on both sides or ends of the package. This change can be made with slight trouble as the several parts of the machine which connect with the labeling mechanism are provided with means for fastening and operating the latter on the left side as well as on the right, where it is now placed.

Another point to which attention is called is the mechanism for operating the wrapper bed. The wrappers are placed on this bed in a stack in the well known manner, and as the machine operates and an individual wrapper is removed from the stack at each cycle of movement, the wrapper bed would naturally travel through a greater distance as the wrappers are exhausted. To provide means therefore to prevent this increased length of movement of the wrapper table, the latter is raised by a weight and its travel is unlimited, so that it will always rise sufficiently high to press the upmost wrapper against the stencils of the carriage 13. The mechanism for depressing the wrapper bed, however, has a limited movement at all times so that after the bed has been raised and a wrapper removed therefrom, the bed will not be carried down to the exact position it previously occupied, but to a position less by the thickness of the wrapper. It will be seen therefore, that after a number of wrappers have been removed from the bed the distance between the uppermost wrapper and stencils of the carriage 13 is the same as at the beginning of the operation of the machine, or in other words the space between the uppermost wrapper and the stencil is always constant.

In the operation of this invention let it be assumed that a stack of wrappers are in proper position upon the wrapper bed 14, and a package supported in place over the folding mechanism, and the fonts properly filled with an adhesive material of the right consistency, which, in case of glue, must be softened by heat in any desired manner before it is ready for use. All now being ready, the lever 64$^e$ is moved to throw the pawl 64$^c$ beneath the transverse lever 64 and prevent the weight 55$^a$ from raising the wrapper bed 14. Either of the shifting levers 43 or 44 may be operated to couple the driving wheel 38 to the shaft 37, so that the shaft 36 with all the cams thereon will begin to turn to the left as indicated by the arrows, and various parts of the machine set in motion with the exception of the gluing devices, and these are thrown into operation by a shifting lever 227 which clutches the shaft 223 with the drive wheel 225. With the machine in motion the carriage 13 will be carried by the chains 9 alternately to and from the folding mechanism and the wrapper bed, passing at each movement over the gluing devices D, the cover plate 239 of which opens and the swinging glue roll 232 therein rises as the carriage moves rearwardly and applies glue to the stencils on said carriage. The wrappers are held away from the carriage by the pawl 64$^c$ heretofore mentioned for the purpose of permitting the carriage to move back and forth several times so that the stencils may be thoroughly covered with adhesive material, after which the lever 64$^e$ withdraws the pawl and the wrapper feeding mechanism is ready to operate.

When the carriage 13 reaches its rearmost position, it pauses for a short time, while the cam 65 through the lever 64, rack bar 63 and connected parts heretofore described, disengages the wrapper bed so that the weight will lift the same and bring the uppermost wrapper into contact with the stencils, thereby applying glue to it in suitable positions to seal the wrapper when folded, and when the bed descends, said wrapper will adhere to the stencils. The carriage is now moved forwardly and passes over the gluing mechanism D, the glue roll 232 of which is in its depressed position in contact with the roll 218 and the cover plate drawn thereover so that the wrapper can not under any circumstances contact with any portion of the gluing mechanism. At the end of the forward movement, the carriage remains stationary for a short time over the throat H inclosing the wrapper mechanism, and below the package to be wrapped. The plunger 92 is now lowered by its cam 102 and forces the package from between the guide bars 377 and 380 of the feed mechanism onto the wrapper, and both wrapper and package into the throat H of the folding mechanism. During the descent of the package and wrapper they pass between the inner ends of the tables 83, 83$^a$, which make the first fold by turning up the ends of the wrapper against the side of the package, which folded portions of the wrapper are smoothed and kept under tension by brushes or other frictional devices 135 on each side of the throat. The movement of the plunger continues until the package and its wrapper are brought between a second set of brushes 136 below the brushes 135. The descending movement of the plunger now stops and it begins to rise until it is sufficiently high to be free of the carriage 13 which then retreats toward the wrapper bed for renewing the stencils with adhesive material and to pick up another wrapper.

After the plunger has been withdrawn from the throat the wing folders 137, 138, are operated to fold down the upstanding portions of the wrapper, the folder 138 moving more rapidly than the folder 137, in order to complete its movement and press its end of the wrapper upon the package before the folder 137 can be brought in contact therewith as the latter folder operates on the glued edge of the wrapper and presses it upon the opposite folded end thus cementing the wrapper around the package in a tubular form. This differential movement of the two folders 137, 138, is produced by the sliding link 141 connected to arms of different lengths on the shafts of the wing folders, as hereinabove described.

The fingers 148 mounted loosely on the shaft 137ª swing downwardly in unison with the wing folder 137, and as soon as they rest upon the package the bolt 152 is moved beneath the lug 150 on the finger supporting yoke and holds said fingers tightly upon the folded wrapper.

Before the wing folders 137, 138 rise certain mechanism operated by a cam, as heretofore described cause two oppositely disposed horizontally moving tucker plates 159, 159ª at each end of the package to advance toward each and fold inwardly the sides of the tubular ends of the projecting portion of the wrapper against the ends of the package. During this movement of the tucker plates the wing folders 137, 138 are returned to their inoperative positions. After the tucker plates have completed their movements to fold the sides of the projecting ends of the wrapper they remain in this position until the plunger, which is now descending for the second time, reaches the package and the wing folders on said plunger begin to turn down the upper projecting ends of the wrapper. The tucker plates now move away from the package and return to their inoperative positions, and just before the completion of said movement the bolt 152 is withdrawn from beneath the lug 150 and the fingers which until this time have been pressing upon the top of the package, return it to their upright positions. As soon as the wing folders on the plunger complete their work they return to position and the package which until this time has been stationary between the brushes 136 begin once more to move through the throat under the impulse of the plunger, passing other brushes at the ends of the package which fold up the final projecting portions of the wrapper and press them against the downwardly folded portions to which they adhere, as the upturned folds are coated with glue received from the stencils. Before the lower folds of the wrapper have been raised too high, the wing folders of the plunger swing upwardly to a horizontal position so that they will be free when the last fold is made and sealed. The downward movement of the plunger continues until the package, now wrapped and sealed has been carried past the brushes 136 and between spring actuated plates 169, 170, it then returns to its highest position. This operation of the machine continues until the packages are folded, each succeeding package pressing the previously folded one down the throat until the lowermost one reaches the end of the throat where it drops upon the bottom 189 of a trough 188 between the sides 192 and 196 of the same. The kicker 200 is now operated in the manner heretofore described and pushes the package along the trough far enough to clear the throat so as to give room for another package to fall, this is in turn removed by the kicker and so on as the packages fall from the throat. Before the lowest package is forced out of the throat H, a label has been carried to the platen 330 of the label mechanism and coated with an adhesive substance by the roll 323 on the end of the bar 320. The swinging arm 332 which carries the platen is then raised by the rock shaft 333 and applies the label on the end of the package.

This machine while designed for various wrapping purposes, is of particular value for wrapping cartons or boxes of equal size and shape, and containing in separate boxes, articles differing in some manner one from another, and affixing on each box the proper label indicative of its contents. As an example of one class of merchandise which this machine is capable of wrapping and correctly labeling may be mentioned collars. These articles as is well known are made in various sizes and have different names applied thereto and are known by such names. Each box contains collars of one size, and when wrapped there is no visible means for ascertaining the size or name of the collars within and great care heretofore was necessary to keep the wrapped boxes containing different sizes and names properly separated.

In the present machine, which is run by two operators, one to feed the boxes, and the other the labels, the wrapping and labeling mechanism are so arranged and their movements so timed, that, when a box is placed in the machine to be wrapped the label fed to the labeling machine substantially coincident therewith, will be affixed to said box.

In wrapping collars, relatively small lots of the various sizes are wrapped at the same time or operation, hence it is necessary to change the labels quite often during the running of the machine. To prevent mistakes in the application of the labels, the timing of the box and label feed have been arranged so that the label affixing platen with a label thereon containing the correct number and name of the collar will coincide at all times with a box containing the same number and name. This accuracy is obtained in the present machine by properly timing the parts and by the operative feeding the filled boxes to be wrapped, reading the label on each box and as soon as he places a box containing a different number in the machine to be wrapped, calling out to the label feed operative the new number who will immediately place on the feed belt a label bearing the number called, so that by the time said label works its way to the label affixing platen, the box containing collars of the same number will be in position to receive said label.

From the above it will readily be seen that with this machine any number of similarly shaped boxes containing different articles, one or more of said boxes being filled with like articles, can be correctly labeled if the label feed operative is given the proper labels, for as soon as he hears the contents of the box called he will place the proper label on the feed belt and be relieved of further responsibility.

Having thus described my invention, what I claim as new and desire to secure by Letters Patent is: —

1. In a package wrapping machine, a wrapper feeding mechanism, a wrapper folding mechanism, means for transporting a wrapper from the feeding to the folding mechanism in position to receive a package to be wrapped, a plunger for advancing the package and its wrapper through the folding mechanism, movable folding devices on the plunger, and means for moving said folding devices into position at a predetermined time to be actuated by contact with the package being wrapped.

2. A package wrapping machine comprising a wrapper holding mechanism, a plunger, means for operating said plunger to deliver a package and its wrapper to the folding mechanism, momentarily withdrawing said plunger and then returning the same to complete the wrapping operation and ejecting the wrapped package, movable folding devices on said plunger, and means for moving said folding devices on the return movement of the plunger into position to be actuated by contact with the package being wrapped.

3. In a package wrapping machine, a bed for supporting a stack of wrappers, means for moving in one direction said wrapper supporting bed an indefinite distance, means for moving said bed in opposite direction a definite distance only, an automatic wrapper folding mechanism, automatic means for transporting a wrapper from the wrapper supporting bed to the wrapper folding mechanism, means for applying an adhesive to said transporting means, a cover for said adhesive applying means, and mechanism for opening and closing said cover operated by the adhesive applying means.

4. In a package wrapping machine, a wrapper transporting carriage, a chain at each side of said carriage, the ends of said chains being attached to the front and rear of said carriage for reciprocating same, sprocket wheels on which the chains are mounted, gearing for operating said sprocket wheels and chains, a driving shaft, and means actuated by said shaft for alternating the rotary movement of the gearing and sprocket wheels to intermittently reciprocate the carriage and hold the same stationary at predetermined times.

5. In a wrapping machine, a wrapper transporting carriage therefor, parallel arms adjustably mounted on said carriage to vary their relative positions with respect to said carriage and to one another, a stencil pivotally mounted on each arm to swing in a vertical plane, and other stencils on the carriage arranged to swing in a horizontal plane.

6. In a package wrapping machine, a wrapper transporting carriage therefor, provided with a fixed transverse bar, a pair of inwardly projecting arms adjustably mounted on said bar, a stencil pivotally mounted on the inner end of each arm to swing in a vertical plane, a plate adjustably mounted on said carriage, and a stencil pivoted on said plate to swing in a horizontal plane.

7. In a package wrapping machine, a wrapper transporting carriage provided with stencils, a glue font below the plane of said stencils, a vibrating glue roll adapted to swing between said glue font and said stencils, a closure, and means operated by the vibrating movement of said glue roll to operate the closure and move the same over said glue roll when the carriage travels in a forward direction.

8. In a package wrapping machine, a wrapper transporting carriage provided with stencils, a glue font below the plane of said stencils, a vibrating glue roll adapted to swing between said stencils and said font, a sliding cover for said glue roll, and mechanism operated by the vibrating movements of the glue roll for drawing the sliding cover over the lowered roll when the transporting carriage moves forward and uncovering said roll when said carriage moves rearwardly to permit the glue roll to engage the stencils on the carriage.

9. In a package wrapping machine, a wrapper transporting carriage provided with stencils, a glue font, a vibrating glue roll carried in pivoted arms and adapted to swing between said glue font and the stencils, a sliding plate adapted to cover said glue roll when the latter is below the plate, fixed rods on which said plate is adapted to slide, and means connected with said sliding plate and with an arm projecting from the hub of one of the glue roll arms for operating said plate as the roll vibrates.

10. In a package wrapping machine, a wrapper transporting carriage provided with stencils, a vibrating roll for applying glue to said stencils, and sliding means for covering said glue roll when the carriage moves forwardly with a wrapper and uncovering the same for the glue roll to pass upwardly as the carriage travels rearwardly.

11. In a package wrapping machine having a throat wherein a package is wrapped, a wrapper transporting means for feeding a wrapper beneath the package and above said throat, a plunger for pushing a package and its wrapper into the throat at the first advance of the plunger as far as the folding position in said throat and then retracting, means for folding the wrapper against the sides of the package during said first advance, pivoted folders having a differential movement adapted to turn the ends of the wrapper over the top of the package, sealing the same and forming said wrapper into tubular shape, sliding tucker plates for simultaneously folding the sides of the tubular wrapper against the ends of the package, pivoted folders on the plunger for turning down the upper projections of the wrapper against the ends of the package, on the second advance of the plunger, and stationary means for completing the folding operation as the package is moved by the plunger beyond the folding mechanism.

12. In a package wrapping machine, a wrapper feed, a package feed, a plunger for advancing said package and wrapper between folding mechanisms and then retreating, means for turning said wrapper against the sides of the package as it advances, and folders movable simultaneously but at different rates of speed for turning one end of the wrapper over the other, and sealing them thereby inclosing the package in a tubular wrapper, sliding tucker plates for simultaneously folding the sides of the tubular wrapper against the ends of the package, adjustable wing folders on the plunger for folding down the upper projecting portions of the wrapper on the second descent of the plunger and fixed devices for turning up the final projections for the wrapper as the package is again advanced by the plunger.

13. Opposed coöperating folders for a wrapping machine, and means connected to said folders on opposite sides of their axes of oscillation, and at different distances from said axes for operating them simultaneously but at different rates of speed.

14. Swinging folders for a wrapping machine, adapted to move simultaneously but at different rates of speed, an arm fixed to the axis of each folder one of said arms being longer than the other, a flexible connection between said arms, and means for operating the arms.

15. Swinging folders for a wrapping machine, adapted to move simultaneously but at different rates of speed, an arm fixed on the axis of each folder, one of which is longer than the other, a sliding link joining the terminals of said arms, a spring carried by said link for yieldingly connecting the arms, and means for directly operating one of said arms.

16. A pair of swinging folders for a wrapping machine, each mounted on a shaft parallel to the other, means connecting said folders and adapted to operate them simultaneously, but at different rates of speed, fingers loosely journaled on the shaft of the slower moving folder and arranged to move operatively with it, a lock for holding said fingers engaged after the folders return to their initial position, and means for operating the lock to disengage said fingers at the proper time.

17. Opposed coöperating folders for a wrapping machine mounted to swing to and from each other, and means connected to said folders on opposite sides respectively of their pivotal axes, and at different distances therefrom for causing simultaneous oscillation of said folders at different speeds.

18. Opposed coöperating folders for a wrapping machine mounted to swing to and from each other, and a longitudinally resilient link attached at its respective ends to said folders on opposite sides of and at different distances from their axes of oscillation for imparting simultaneously movement at different speeds to said folders.

19. Swinging coöperating folders for a wrapping machine, and longitudinally yielding connecting means between said folders attached thereto on opposite sides respectively of their pivotal axes for causing them to swing simultaneously but at different rates of speed.

20. In a wrapping machine, folding mechanism, a plunger, means for reciprocating said plunger twice during each complete wrapping operation, and folders carried by said plunger adapted to move a package and wrapper into the folding mechanism on the first reciprocation of the plunger and be actuated by said package to operate on the wrapper during the second reciprocation of said plunger.

21. In a wrapping machine, folding mechanism, a plunger, means for reciprocating said plunger twice during each complete wrapping operation, folders carried by said plunger adapted to move a package and wrapper into the folding mechanism on the first reciprocation of the plunger and be actuated by said package to operate on the wrapper during the second reciprocation of the plunger, and means for moving said folders to permit their actuation.

22. In a wrapping machine, a plunger, means for reciprocating the same twice during each folding operation, pivoted wing folders mounted on said plunger arranged to engage with and advance a package a predetermined distance at its first reciprocation and on its second reciprocation to partly fold the wrapper and complete the movement of the package.

23. A plunger for wrapping machines, means for reciprocating the same twice during each folding operation, said plunger provided with pivoted and slidable wing folders arranged to engage with and advance a package a predetermined distance at its first reciprocation and then fold a portion of the wrapper at its second reciprocation and push the completed package below the wrapping devices.

24. A plunger for wrapping machines, means for reciprocating the same twice during each folding operation, said plunger provided with pivoted and slidable wing folders arranged to engage with and advance a package a predetermined distance at its first reciprocation, means for sliding said wing folders a suitable distance to permit them to act on the wrapper near the end of the second reciprocation and fold a portion thereof and then restore said folders to their initial position for ejecting a package beyond the folding devices.

25. A plunger for wrapping machines, comprising a pair of slidable heads mounted thereon, wing folders pivotally mounted on said heads and beneath the same, and means for simultaneously moving the heads in opposite directions a predetermined distance.

26. A plunger for wrapping machines comprising a vertical sliding bar provided with a support at its lower end, a head movable longitudinally on said support on each side of the vertical bar, a wing folder pivoted on each head, and means for sliding said heads in opposite directions to bring the pivots of the folders beyond the ends of the package and enable said pivoted folders to turn on their axes and fold down a portion of the wrapper.

27. A plunger for wrapping machines comprising a vertical sliding bar having a support on its lower end, a head slidable longitudinally upon the support on each side of said vertical bar, wing folders pivoted below the heads near the inner ends of said folders, a rod attached to each head and extending inwardly and means for operating said rods and heads in opposite directions.

28. A plunger for wrapping machines comprising a vertical sliding bar having a support on its lower end, a head slidable longitudinally upon said suport on each side of said vertical bar, wing folders pivoted below the heads near the inner ends of said folders, a shaft parallel to the vertical bar, a rod attached to each head and extending inwardly, connecting means between said shaft and the rods and means for turning said shaft to operate said rods in opposite directions.
29. A plunger for wrapping machines comprising a vertical sliding bar having a horizontal bar on its lower end, a head slidable longitudinally upon the horizontal bar on each side of said vertical bar, wing folders pivoted below the heads near the inner ends of said folders, a shaft parallel to the vertical bar and provided with a fixed pinion beneath the horizontal bar, a rack on opposite sides of said pinion, a rod attached to each head and one of said racks, and means for turning said shaft.

30. A plunger for wrapping machines comprising a vertical sliding bar having a support secured on its lower end, means for moving said vertical bar, a head slidable longitudinally upon the support on each side of said vertical bar, wing folders pivoted beneath the heads near the inner ends of said folders, a shaft parallel to the vertical bar and provided with a fixed pinion below the support, a rack on opposite sides of said pinion, a rod adjustably attached to each head and to one of said racks, and means for turning said shaft independent of the sliding bar moving means.

31. A plunger for wrapping machines comprising a vertical sliding bar having a horizontal bar secured on its lower end, a head slidable longitudinally upon the horizontal bar on each side of said vertical bar, wing folders pivoted below the heads near the inner ends of said folders, a shaft parallel to the vertical bar and provided with a fixed pinion beneath the horizontal bar, a rack on opposite sides of said pinion, a rod attached to each head and one of said racks, a pinion on said shaft rotatable therewith and slidable thereon, and means for rotating said pinion.

32. A plunger for a wrapping machine comprising a vertical sliding bar having a support on its lower end, a head movable longitudinally on said support on each side of the vertical bar, a wing folder pivoted below each head near one end of said folder, means for reciprocating the plunger, and separate means for moving the heads.

33. A plunger for a wrapping machine comprising a vertical sliding bar having a support fixed on its lower end, a head movable longitudinally on said support on each side of the vertical bar, a wing folder pivoted below each head, means for reciprocating the plunger twice during each wrapping operation of the machine, and separate means for moving said heads but once in the same time.

34. In a package wrapping machine, a plunger, means for reciprocating the same twice during each folding operation, horizontally disposed wing folders on its under side adapted to slide and swing on said plunger and contact with the package on the first advance of the plunger to push said package between the folding devices, folders for closing the wrapper around the package, tucker plates for giving the first end folds to the wrapper, and means for sliding the wing folders on the plunger outwardly to enable them at the second advance thereof to swing on their pivots and form the second end fold and afterward to return to their initial position.

35. A plunger for a wrapping machine provided with swinging wing folders on the under side thereof which engage and push the package to the folding devices as the plunger advances, and means for sliding said wing folders at a predetermined time in position to fold a portion of the wrapper and afterward returning said folders to initial position.

36. In a package wrapping machine, a wrapper feed, a plunger, folding devices forming a throat through which a package passes while being wrapped, vertically disposed pressure plates forming a continuation downwardly of said throat for temporarily holding the wrapped packages, an intermittently movable label feeding device, mechanism for registering individual labels on said device, a swinging platen for applying labels on packages while between the pressure plates, means for transporting labels from the feed device to the platen, and means for applying an adhesive on the back of the label as it rests on the platen.

37. In a package wrapping machine, a wrapper feed, a plunger, folding devices forming a throat through which packages pass while being wrapped, vertically disposed pressure plates forming a downward continuation of said throat for temporarily holding wrapped packages, an intermittently movable label feed belt on which labels are placed one at a time, mechanism for registering each individual label on said belt, a swinging suction platen for supporting labels while being coated with an adhesive and applying said labels to the packages, suction means for transporting labels from the feed device to said suction platen, and an adhesive applying apparatus for the labels.

38. In a package wrapping machine, a wrapper feed, a plunger, folding devices forming a throat through which a package passes while being wrapped, vertically disposed pressure plates forming a continuation of said throat, an intermittently movable label feed belt, a guide to position labels when placed on the belt, a pasting device, a swinging platen for applying labels on packages while between the pressure plates, means for registering individual labels on the feed belt in line with said platen, and means for transporting labels from the feed belt to the platen.

39. In a package wrapping machine, a wrapper feed, a plunger, paste applying mechanism for the wrapper, folding devices forming a throat through which a package is forced by said plunger while being wrapped, a main driving shaft and cams on said shaft for imparting movement to the aforesaid parts, an intermittently movable label feed belt, a pasting device for the label, a swinging platen for carrying a label to and applying it on a wrapped package, means for registering individual labels on said feed belt in line with the platen, means for transporting labels from said feed belt to said platen, a rock shaft, means connected to said rock shaft for operating the label pasting device and the label registering device, and connections from said main shaft to said rock shaft.

40. A package wrapping machine, having a trough for receiving wrapped packages comprising a flat bottom, a spring pressed plate on one side and a series of vertically pivoted rollers on the opposite side.

41. In a package wrapping machine, a wrapping mechanism, means for feeding wrappers thereto, means for feeding packages thereto and inclosing them in said wrappers, means for carrying labels to and placing them on said wrapped packages, means for intermittently feeding labels individually placed thereon to said label carrier, and operating means so timed that a package fed to the machine will be wrapped and labeled by a label placed on the label feed simultaneously with the feed of the package.

42. A package wrapping machine, comprising a package feed, package wrapping mechanism, a label affixing device, and means for operating the same, said mechanisms being so timed that a package fed to the machine will be wrapped and labeled by a label fed to the affixing device simultaneously with the feed of the package.

43. In a package wrapping machine, a wrapping mechanism, means for feeding wrappers to said mechanism for inclosing a package placed in proper relation thereto, means for carrying labels to and placing them on wrapped packages, means for feeding labels individually placed thereon to said label carrier, and operating means so timed that a package will be wrapped and labeled by a label placed on the label feed simultaneously with the placing of the package.

44. In a machine of the character described, the combination with means for wrapping and folding paper about an article, of means for moving the article, means for feeding a label and timing the same to the movement of the article to be wrapped, and means for transferring the label from the conveying means to the wrapped article and for pasting the same on one side during said transfer.

45. In a machine of the character described, the combination with means for wrapping and folding paper about an article, of means for moving the article, means for feeding a label and timing the same to the movement of the article to be wrapped and means for transferring the label from the conveying means to the wrapped article.

In testimony whereof I have hereunto set my hand in presence of two subscribing witnesses.

PHILIP S. SMITH.

Witnesses:
J. GRANVILLE MEYERS,
GEO. Z. SUTTON.